(12) United States Patent
Stefanko et al.

(10) Patent No.: US 10,457,495 B2
(45) Date of Patent: Oct. 29, 2019

(54) OPERATION OF AN ACTIVE CONTROL ROLLER TOP CONVEYING ASSEMBLY

(71) Applicant: REXNORD INDUSTRIES, LLC, Milwaukee, WI (US)

(72) Inventors: Justin Michael Stefanko, Pewaukee, WI (US); Philip Michael Gabor, Thiensville, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 15/522,988

(22) PCT Filed: Oct. 30, 2015

(86) PCT No.: PCT/US2015/058309
§ 371 (c)(1),
(2) Date: Apr. 28, 2017

(87) PCT Pub. No.: WO2016/070042
PCT Pub. Date: May 6, 2016

(65) Prior Publication Data
US 2017/0334661 A1    Nov. 23, 2017

Related U.S. Application Data

(60) Provisional application No. 62/073,276, filed on Oct. 31, 2014.

(51) Int. Cl.
*B65G 47/24*    (2006.01)
*B65G 47/26*    (2006.01)
*B65G 17/24*    (2006.01)
*B65G 47/244*   (2006.01)

(52) U.S. Cl.
CPC ......... *B65G 47/268* (2013.01); *B65G 17/24* (2013.01); *B65G 47/2445* (2013.01); *B65G 2811/0626* (2013.01); *B65G 2811/0631* (2013.01)

(58) Field of Classification Search
CPC ..... B65G 47/2445; B65G 17/22; B65G 17/24
USPC .............. 198/411, 412, 577, 779, 617
See application file for complete search history.

(56) References Cited

U.S. PATENT DOCUMENTS

| | | | | |
|---|---|---|---|---|
| 1,321,303 | A * | 11/1919 | Haldeman | B65G 47/2445 198/415 |
| 3,653,489 | A   | 4/1972  | Tullis et al. | |
| 3,722,657 | A * | 3/1973  | Kienle | B65G 47/2445 198/394 |
| 3,726,390 | A * | 4/1973  | Fletcher | B65G 13/071 198/617 |
| 3,894,627 | A   | 7/1975  | Jabbusch et al. | |

(Continued)

OTHER PUBLICATIONS

PCT International Search Report and Written Opinion, PCT/US2015/058309, dated Jan. 20, 2016.

(Continued)

*Primary Examiner* — Joseph A Dillon, Jr.
(74) *Attorney, Agent, or Firm* — Quarles & Brady LLP

(57) ABSTRACT

A modular conveying assembly includes active roller control for reducing backline pressure without product to product contact when accumulating products. Methods are discussed for manipulating objects by a bump-through indexing operation, a slug-control indexing operation, a catch-and-release indexing operation, box or case turning operations, and zero-pressure accumulation operations.

10 Claims, 21 Drawing Sheets

(56) References Cited

U.S. PATENT DOCUMENTS

| | | | |
|---|---|---|---|
| 4,231,469 A | | 11/1980 | Arscott |
| 4,262,794 A | | 4/1981 | Bourgeois |
| 4,312,266 A | * | 1/1982 | Pasic .................... B65B 13/183 100/14 |
| 4,807,739 A | * | 2/1989 | Wolf .................. B65G 47/2445 198/415 |
| 4,821,169 A | | 4/1989 | Sites et al. |
| 4,880,107 A | | 11/1989 | Deal |
| 5,096,050 A | | 3/1992 | Hodlewsky |
| 7,311,192 B2 | | 12/2007 | Fourney |
| 7,426,992 B2 | | 9/2008 | Fourney |
| 7,665,597 B2 | * | 2/2010 | Neville ................ B65G 13/075 198/411 |
| 7,731,010 B2 | * | 6/2010 | Kissee .................. B65G 17/24 198/370.09 |
| 7,861,849 B2 | | 1/2011 | Fourney |
| 8,151,978 B2 | | 4/2012 | Wieting et al. |
| 8,205,738 B1 | * | 6/2012 | Fourney ............ B65G 47/2445 198/415 |
| 8,342,313 B2 | | 1/2013 | Wargo et al. |
| 9,624,038 B2 | * | 4/2017 | Lanzi .................... B65G 37/00 |
| 2005/0011727 A1 | * | 1/2005 | Meyer .................... B65G 13/02 198/415 |
| 2005/0072656 A1 | * | 4/2005 | Costanzo ............... B65G 17/24 198/779 |
| 2006/0151296 A1 | * | 7/2006 | Halang .................. B65G 17/24 198/779 |
| 2006/0163035 A1 | * | 7/2006 | Pahud ................ B65G 21/2036 198/415 |
| 2007/0074954 A1 | * | 4/2007 | Neville ................ B65G 13/075 198/401 |
| 2007/0221475 A1 | * | 9/2007 | Halsey ................ B65G 13/071 198/442 |
| 2008/0121498 A1 | | 5/2008 | Costanzo et al. |
| 2009/0008218 A1 | | 1/2009 | Fourney |
| 2010/0065401 A1 | * | 3/2010 | Dowe .................... B65G 17/24 198/401 |
| 2010/0108468 A1 | * | 5/2010 | Fourney ................ B65G 17/24 198/617 |
| 2012/0285799 A1 | | 11/2012 | Fourney |
| 2013/0087430 A1 | * | 4/2013 | Kirk ....................... B65G 17/24 198/411 |
| 2014/0116853 A1 | | 5/2014 | Chinnock et al. |
| 2016/0251169 A1 | | 9/2016 | Stefanko |

OTHER PUBLICATIONS

Bastian Solutions, Zero Pressure Roller Conveyor, http://store.bastiansolutions.com/equipment/category.aspx/131/downloads/steelking/Zero-Pressure-Roller-Conveyor-C6.aspx, Printed 2017.

Hytrol, EZLogic(R) Accumulation System, http://web.archive.org/web/20170107110757/http://www.hytrol.com/web/index.php/solutions/by-product/ezlogic, Jan. 7, 2017, 6 pages [from archive.org].

Hytrol Conveyor Company, Zero Pressure Accumulation Roller Conveyor—Model ABEZ, https://www.youtube.com/watch?v=aOF_BWmbhKc, Published on Apr. 29, 2014.

Interroll Group, Drive Types for Conveyor Rollers, https://web.archive.org/web/20140912202558/http://www.interroll.com/en/interroll-group/products/conveyor-rollers/technical-information/drives/drives.php, Sep. 12, 2014, 1 page [from archive.org].

Interroll, Drives and Controls—Products, https://www.interroll.us/products/drives-and-controls/, Printed Sep. 27, 2017, 7 pages.

Interroll, 24 VDC Products, Roller Drives & Drive Control Card, Product Information, Printed Sep. 27, 2017, 12 pages.

Interroll, Conveyor Solutions, Rollers & 24 Volt DC RollerDrive, Product Information, Apr. 2015, 17 pages.

Intralox, ARB Case Turners: ARB Case Turner Rotates and Aligns Nearly All Products in a Small Footprint, http://web.archive.org/web/20140907075640/http://www.intralox.com/case-turners.aspx, Sep. 7, 2014, 2 pages [from archive.org].

Shuttleworth, Positioning & Orienting Conveyors—Rotate, Invert, Up-End Product Conveying, http://www.shuttleworth.com/products/solutions-by-application/positioning-orienting-conv . . . , Printed Jul. 14, 2017, 2 pages.

Vande Berg Scales, Indexing Conveyors, http://vbssys.com/indexing-conveyor/, Copyright 2015 VBS, Inc., 2 pages.

European Patent Office, Extended European Search Report, Application No. 15855978.1, dated Aug. 21, 2018, 8 pages.

* cited by examiner

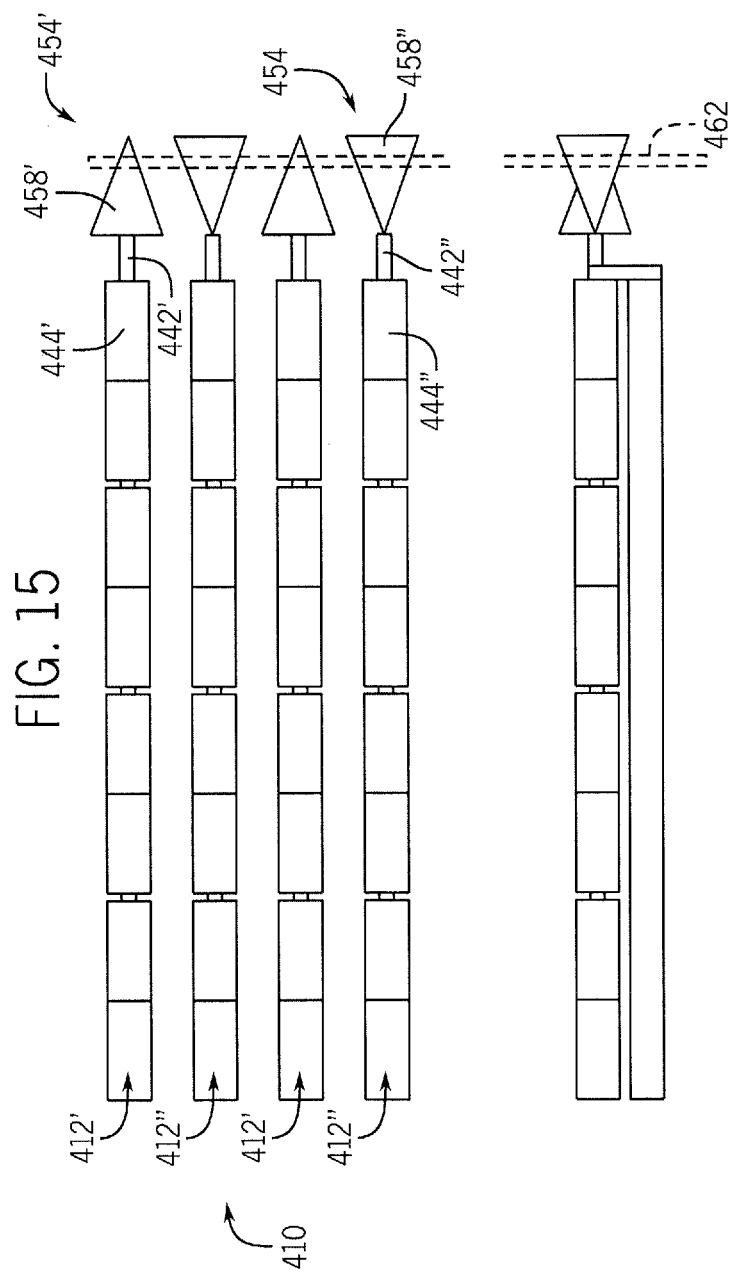

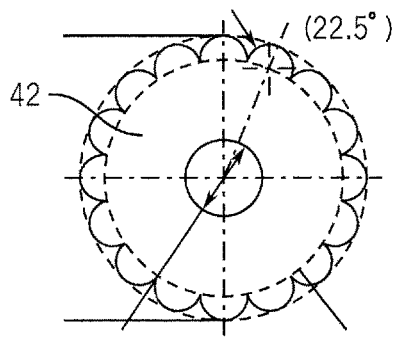
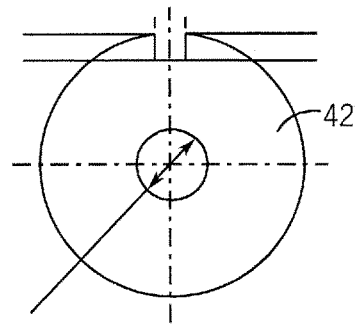
FIG. 17a      FIG. 17b
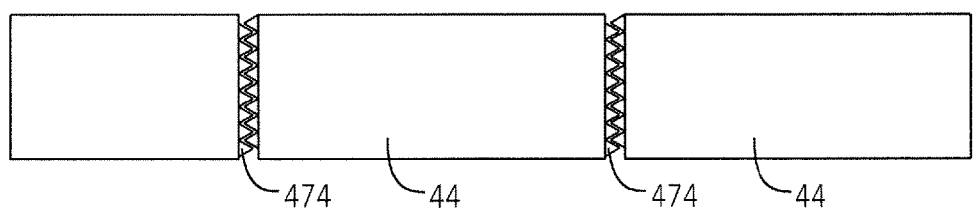
FIG. 18
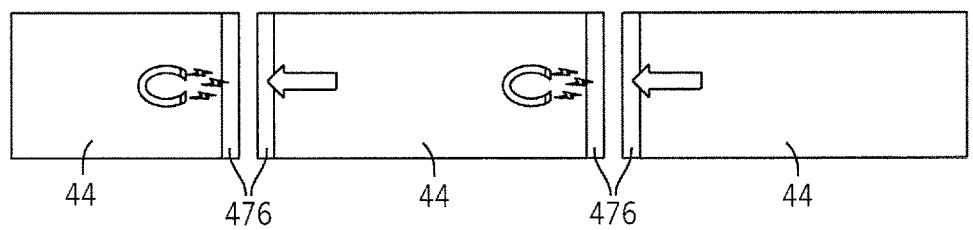
FIG. 19

OPERATION OF AN ACTIVE CONTROL ROLLER TOP CONVEYING ASSEMBLY

CROSS-REFERENCE TO RELATED APPLICATIONS

This application represents the national stage entry of PCT International Application No. PCT/2015/058309 filed on Oct. 30, 2015, which cairns the benefit of U.S. Provisional Patent Application Ser. No. 62/073,276, filed on Oct. 31, 2014, the entire contents of which are incorporated herein by reference for ail purposes.

BACKGROUND OF THE INVENTION

The present invention relates to modular conveyor belts and chains, and more particularly to an active control roller top conveyor module and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce backline pressure. In addition, the belt can easily damage a high friction products during accumulation. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is necessary to have a portion of the roller extend above the module to engage the object being conveyed to reduce backline pressure, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing backline pressure is disclosed in U.S. Pat. No. 4,231,469 issued to Arscott. In Arscott, rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

Rexnord Industries, LLC of Milwaukee, Wis. developed roller top conveying modules that include roller axle supports that support freewheeling rollers above a module top surface. See U.S. Pat. Nos. 8,151,978, 5,096,050, 4,880,107, and 4,821,169. These modules are easily assembled and do not require oversize rollers extending through the conveyor modules. These prior art modules allow accumulation of product being conveyed by a conveying system formed from modules by providing a low backline pressure when the products are stopped on the moving modules. Absent individual external stops for each product being conveyed, the conveyed products engage other products when accumulating on the conveyor system.

SUMMARY OF THE INVENTION

The present invention provides a modular conveying assembly with active roller control for reducing backline pressure without product to product contact when accumulating products. The conveying assembly includes a first roller belt module having a top surface and at least one first roller axle support extending above the top surface. The first axle support supports at least one roller above the top surface. The at least one roller is rotatably coupled to a rotatably driven drive axle, such that rotation of the drive axle causes rotation of the roller. A clutch including a driven surface fixed to the drive axle engages a driving member to rotatably drive the drive axle and, thus the roller.

A general objective of the present invention is to provide a belt module and a modular conveying assembly formed therefrom that can accumulate objects without product to product contact. This objective is accomplished by providing a conveyor belt module having an actively driven roller rotatably supported above the conveyor module body top surface.

This and still other objectives and advantages of the present invention will be apparent from the description which follows. In the detailed description below, preferred embodiments of the invention will be described in reference to the accompanying drawing. These embodiments do not represent the full scope of the invention. Rather, the invention may be employed in other embodiments. Reference should therefore be made to the claims herein for interpreting the breadth of the invention.

In one embodiment, the invention provides a method of indexing a first object and a second object. The method includes supporting the first object on rollers of a conveyor belt, activating an actuator in a manipulation zone such that the rollers counter rotate within the manipulation zone, conveying the first object in a first direction into the manipulation zone, maintaining the first object in the manipulation zone with the counter rotating rollers, supporting the second object on the rollers of the conveyor belt, conveying the second object in the first direction and into contact with the first object, moving the first object at least partially out of the manipulation zone with the second object, and maintaining the second object in the manipulation zone with the counter rotating rollers.

In another embodiment, the invention provides a method of indexing a first object and a second object. The method includes supporting the first object on rollers of a conveyor belt, conveying the first object in a first direction into a manipulation zone, activating an actuator in the manipulation zone such that the rollers counter rotate to maintain the first object within the manipulation zone, supporting the second object on the rollers of the conveyor belt, conveying the second object in the first direction, deactivating the actuator such that the conveyor moves the first object and the second object in the first direction within the manipulation zone, activating the actuator such that the rollers counter rotate to maintain the first object and the second object within the manipulation zone, and deactivating the actuator such that the conveyor moves the first object out of the manipulation zone.

In another embodiment, the invention provides a method of conveying an object. The method includes supporting the object on rollers of a conveyor belt, activating a first actuator in a first manipulation zone such that the rollers counter rotate within the first manipulation zone, conveying the object in a first direction into the first manipulation zone, maintaining the object in the first manipulation zone with the counter rotating rollers, deactivating the first actuator such that the conveyor moves the object out of the first manipulation zone, activating a second actuator in a second manipulation zone such that the rollers counter rotate within the second manipulation zone, conveying the object in the first direction into the second manipulation zone, maintaining the object in the second manipulation zone with the counter rotating rollers, and deactivating the second actuator such that the conveyor moves the object out of the second manipulation zone.

In another embodiment, the invention provides a method of turning an object on a conveyor assembly. The method includes supporting the object on first rollers defining a first motion zone, and second rollers defining a second motion zone, activating a first actuator such that the first rollers rotate in a first direction within a first manipulation zone, activating a second actuator such that the second rollers rotate in a second direction, opposite the first direction, within a second manipulation zone, and turning the object as a result of the relative rotation of the first rollers and the second rollers.

BRIEF DESCRIPTION OF THE DRAWINGS

FIG. 15 is a top view of a modular conveyor belt assembly according to the invention that includes two different motion zones.

FIG. 16 is a front view of the modular conveyor belt assembly of FIG. 15.

FIGS. 17a and 17b are section views of roller axles according to the invention.

FIG. 18 is a top view of a toothed connection between rollers.

FIG. 19 is a top view of a magnetic connection between rollers.

DETAILED DESCRIPTION OF PREFERRED EMBODIMENTS

Figure 1:
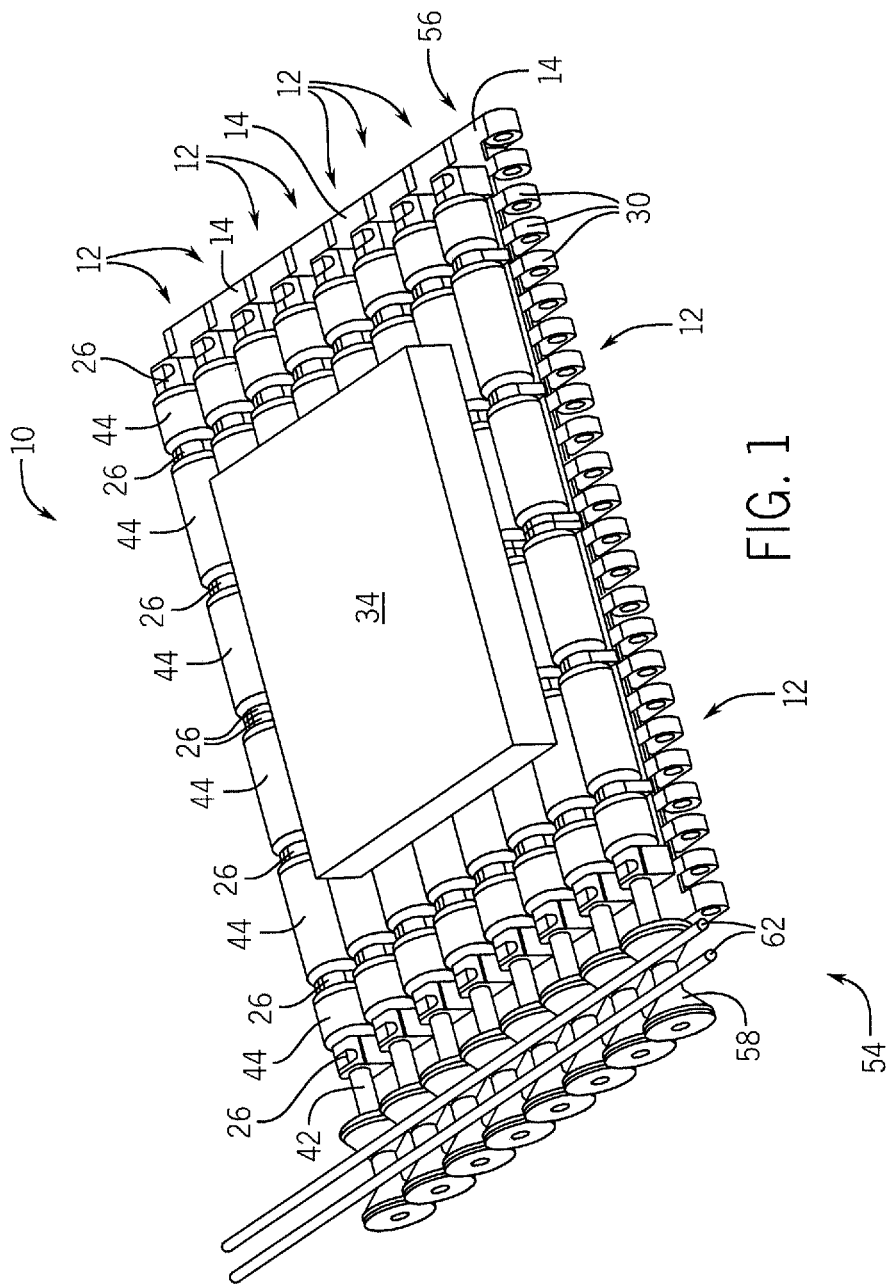
FIG. 1 is a perspective view of a modular conveyor belt assembly according to the invention.

A modular conveying assembly, or belt 10, shown in FIG. 1, includes a plurality of belt modules 12 assembled in an edge to edge relation to form the continuous belt 10. Hinge pins 40 (see FIG. 2) join adjacent modules 12, and pivotally connect the adjacent modules 12 in the direction of belt travel. Roller axle supports 26 extending upwardly from a module body 14 of each belt module 12 support a roller axle 42 (see FIG. 2) having a plurality of rollers 44 fixed thereto. The rollers 44 rotatably engage an object 34 being conveyed by the belt 10 to reduce friction between the belt 10 and the object and, as described below, selectively convey the object relative to the module body 14. The modules 12 are preferably formed using methods known in the art, such as injection molding, from materials known in the art, such as acetal, polyethylene, polypropylene, nylon, and the like.

Figure 3:
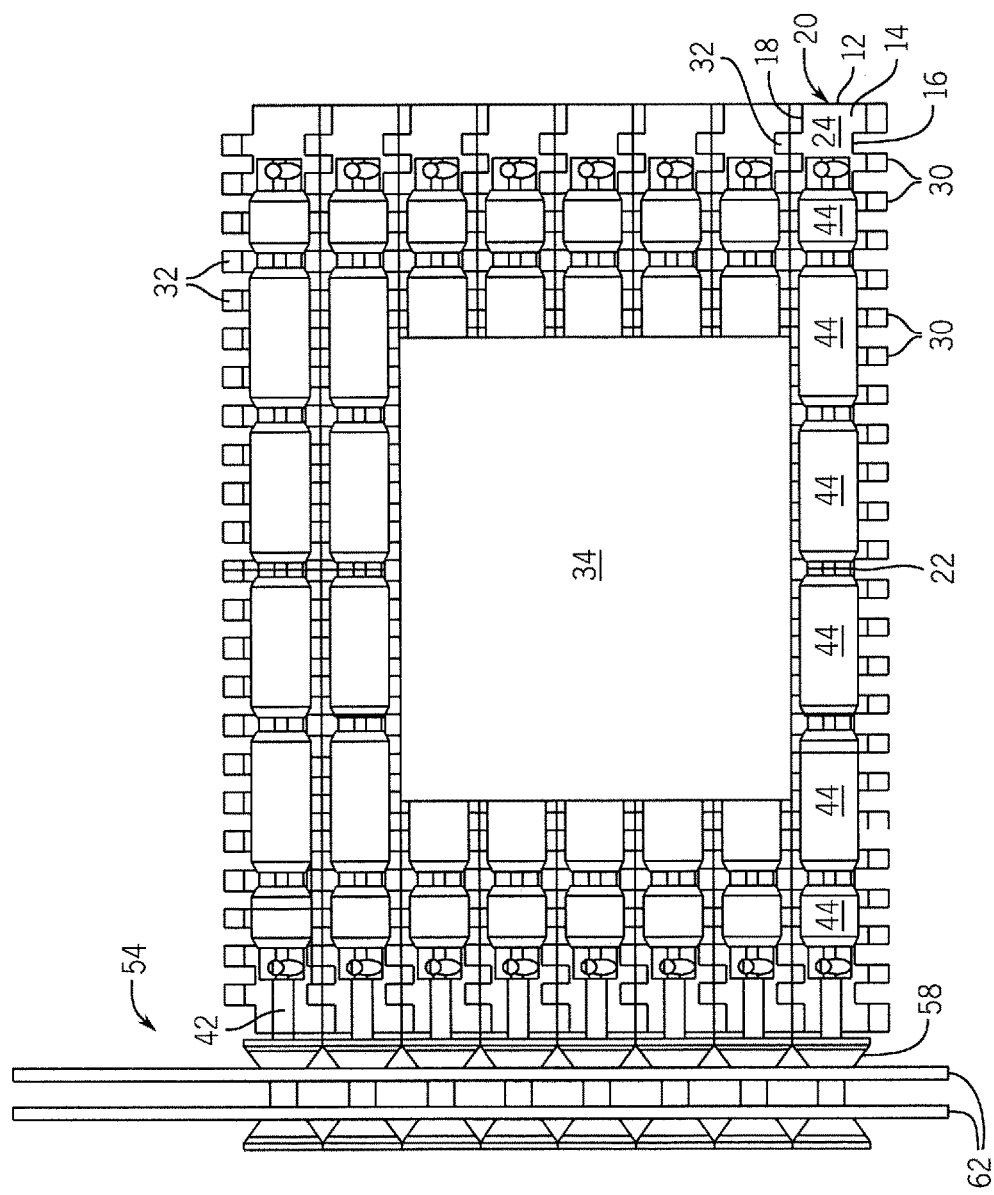
FIG. 3 is a top view of the assembly shown FIG. 1.
Figure 4:
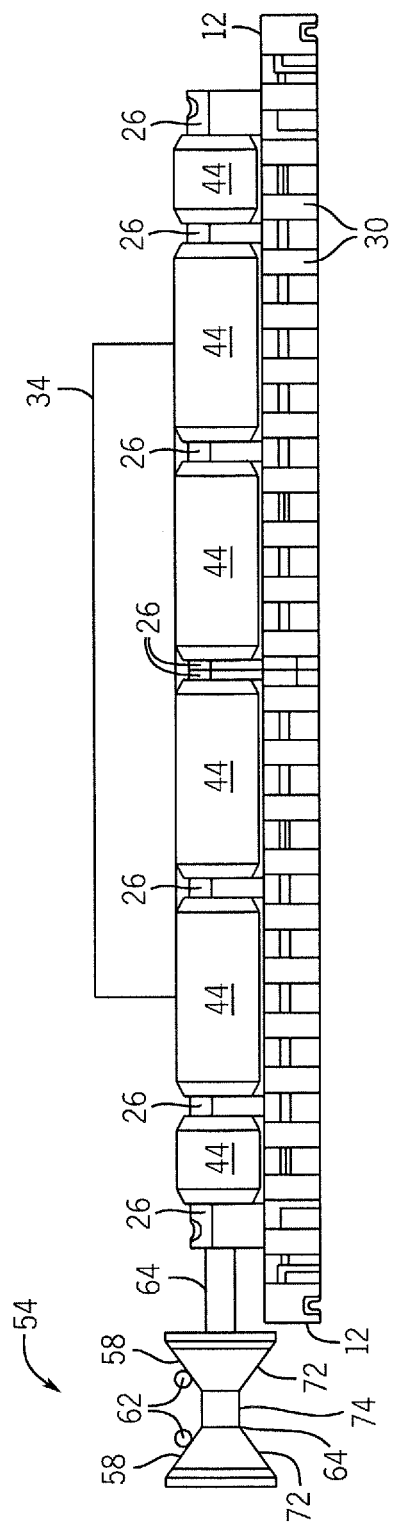
FIG. 4 is a front view of the assembly shown FIG. 1.

Each module 12 includes a body 14 having a top surface 24 (see FIG. 3) surrounded by a leading edge 16 and trailing edge 18 joined by a first side edge 20 and a second side edge 22. Although, the terms "leading" and "trailing" are used to identify features of the module 12, the module 12 described herein can be used in any direction, or orientation without departing from the scope of the invention. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Figure 2:
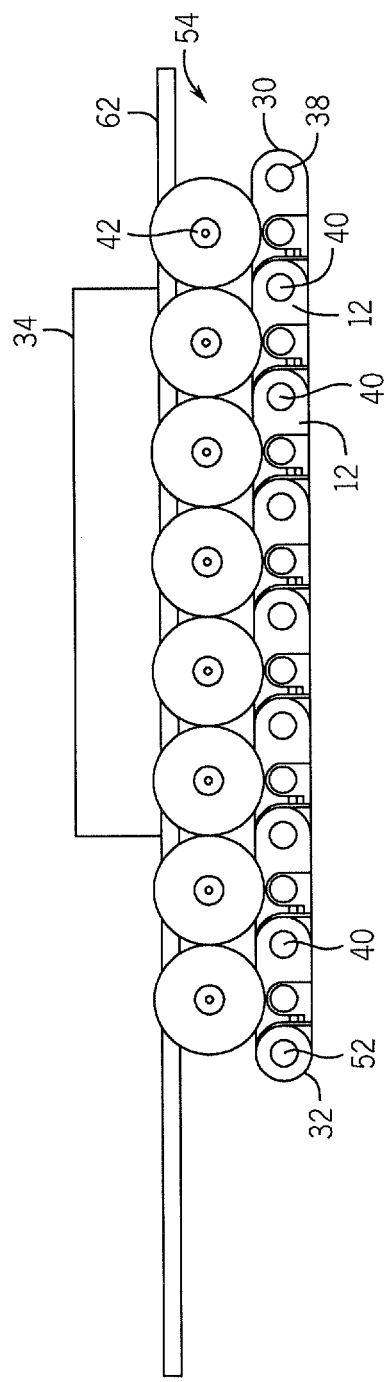
FIG. 2 is a side view of the assembly shown in FIG. 1.

With reference to FIG. 2, each leading edge hinge member 30 extends forwardly from the leading edge 16 of the module body 14, and includes a coaxial opening 38 for receiving the hinge pin 40. Each leading edge hinge member opening 38 receives the hinge pin 40 pivotally connecting the leading edge hinge members 30 of one module 12 to trailing edge hinge members 32 of an upstream module 12. The leading edge hinge members 30 intermesh with trailing edge hinge members 32 extending rearwardly from the trailing edge 18 also include coaxial openings 52. The trailing edge hinge members 32 include coaxial openings 52 that receive the hinge pin 40 to pivotally connect the trailing edge hinge members 32 of the module 12 to leading edge hinge members 30 of a downstream module 12.

The roller axle supports 26 are spaced across the module top surface 24 in a row 56 transverse to the direction of conveyor travel. Each axle support 26 includes a coaxial opening 46 for receiving the roller axle 42. Advantageously, the plurality of axle supports 26 do not allow the roller axle 42 to pop upwardly away from the modules 12 if the roller 44 or roller axle 42 catches an object. Although a plurality of axle supports 26 in a single row on each module 12 is shown, a single axle support extending upwardly from the module top surface forming a row or a plurality of axle support rows on a single module can be provided without departing from the scope of the invention.

The roller axle 42 can be formed from any material, such as a polymeric material, metal, and the like. Polymeric roller axles 42 are preferred because they are lighter and produce less noise. Each roller axle 42 supports a plurality of the rollers 44. Preferably, a single roller 44 is disposed between a pair of axle supports 26, however, a plurality of rollers 44 can be provided between a pair of axle supports 26 without departing from the scope of the The rollers 44 support the object 34 being conveyed by the belt 10 above the module body 14 and are rotatably fixed to the roller axle 42. At least a portion of each roller 44 extends above the roller axle supports 26 to engage the object being conveyed by the belt 10. Preferably, each roller 44 is molded from a plastic, and includes a through hole 46 formed there through for receiving the roller axle 42. The rollers 44 can be rotatably fixed to the roller axle 42 using methods known in the art, such as by chemically bonding the roller 44 to the axle 42, fusing the roller 44 to the roller axle 42, integrally forming the roller axle 42 and roller 44 as a single piece, forming a through hole axially through the roller 44 with a noncircular cross section and inserting the roller axle 42 having a complementary cross section through the roller 44 through hole, and the like without departing from the scope of the invention. Although a plastic roller is disclosed, the roller can be formed from any material, such as elastomers, metals, and the like, suitable for the particular application without departing from the scope of the invention.

The roller axle 42, and thus the rollers 44 are selectively rotatably driven to accumulate objects on the conveyor system without excessive product to product contact and/or to selectively space objects conveyed by the conveying system. In the embodiment shown in FIGS. 1-4, the roller axle 42 is actively driven by a clutch 54 having a driven surface 58 fixed to one end of the roller axle 42 and a fixed driving member 62, or bar, adjacent the belt 10. The driving member 62 engages the driven surface 58 to rotatably drive the roller axle 42, and thus the roller 44. In a preferred embodiment, movement of the conveyor module 12 relative to the fixed driving member 62 engaging the driven surface 58 of the clutch 54 causes the driven surface 58, and thus, the roller axle 42 and rollers 44 to rotate.

In one embodiment, the driven surface 58 is conical to control the rotational speed of the roller 44 without changing the conveying speed of the belt 10. In particular, the rotational speed of the roller 44 varies by engaging the conical driven surface 58 at different radii of the conical driven surface 58 with the driving member 62. As a result, when the belt 10 travels at a constant conveying speed, the rollers 44 will rotate faster when the fixed driving member 62 engages a small radial cross section of the conical driven surface 58, i.e. proximal an apex 64 of the conical driven surface 58 (see FIG. 4), compared to the rotational speed of the rollers 44 when the fixed driving member 62 engages a larger radial cross section of the conical driven surface 58.

Figure 5:
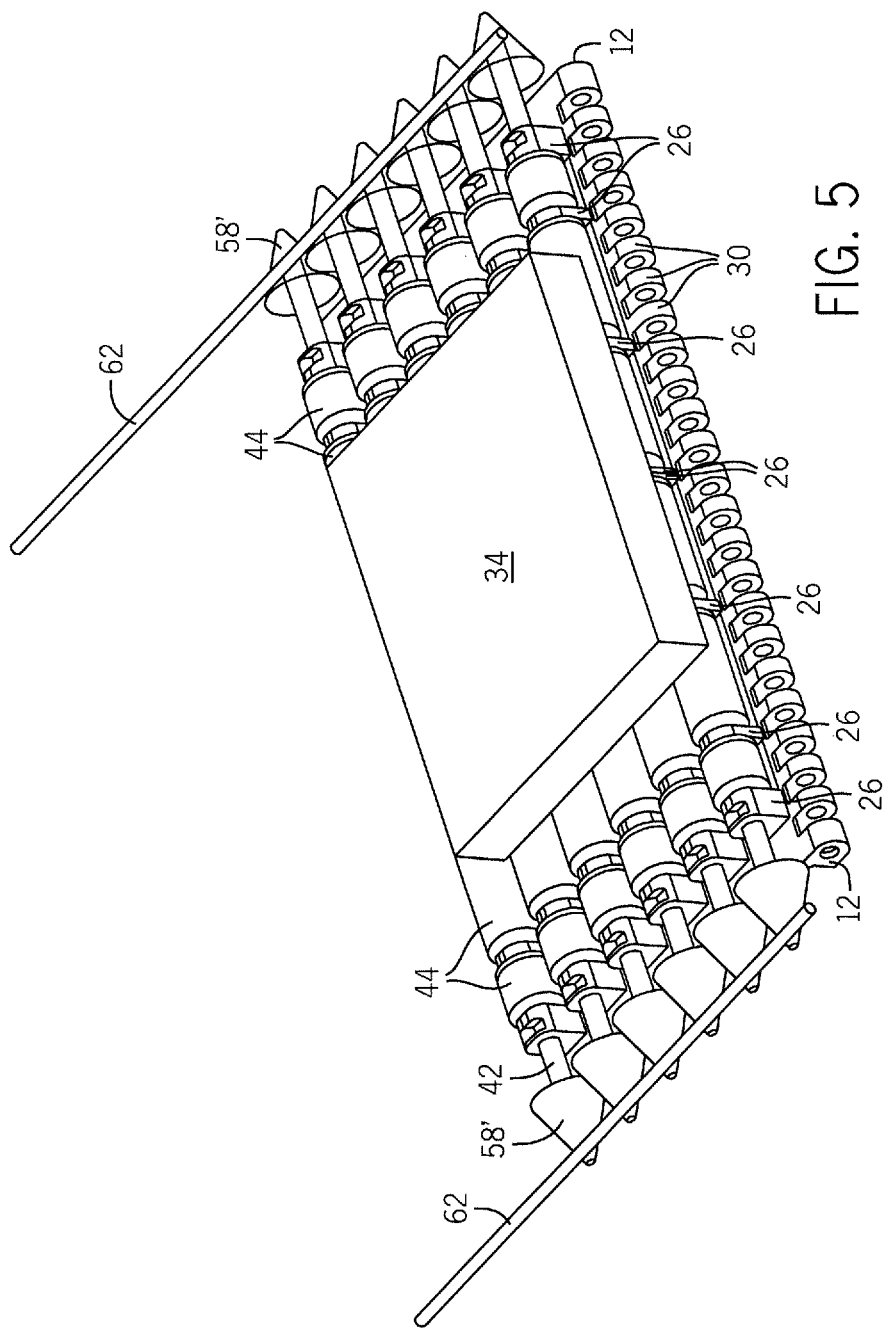
FIG. 5 is a front view of another modular conveyor assembly according to the invention and having rollers driven from both sides of the assembly.
Figure 6:
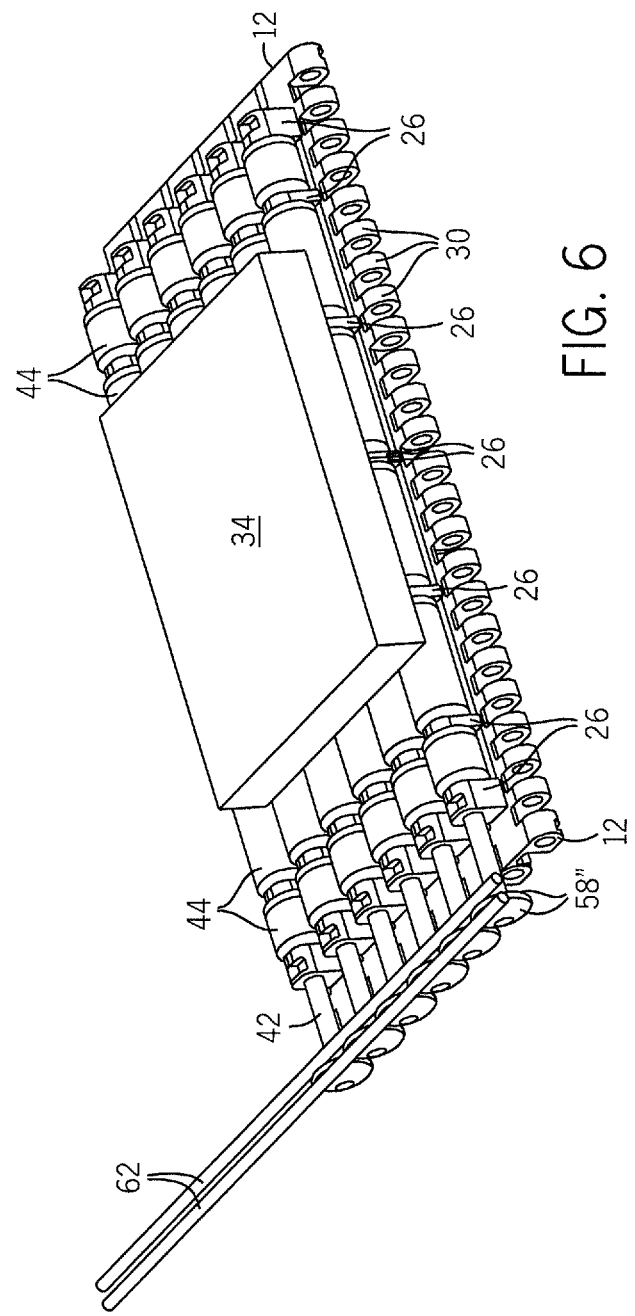
FIG. 6 is a perspective view of another modular conveyor assembly according to the invention in which the driven axle rotatably drives a roller axle defining an angle with the driven axle.

In the embodiment disclosed in FIGS. 1-4, the driven surface 58 is formed having two conical driven surfaces 72 forming part of two cones joined at their apex by a cylindrical driven surface 74. The driven surface 58, however, can be any shape compatible with the driving member without departing from the scope of the invention. For example, the driven surface 58' can be a single conical surface, such as shown in FIG. 5, cylindrical, frustoconical, two frustoconical surfaces 58" joined at their base, such as shown in FIG. 6, have teeth engageable with a toothed rack driving member, stepped, and the like. Moreover, although the driven surface 58 is shown on one end of the roller axle 42, the driven surface 58 can be on both ends of the roller axle 42, such as shown in FIG. 5, between the roller axle ends, or fixed to a driven axle coupled to the roller axle 42 without departing from the scope of the invention. Although a driven surface 58 separate from the rollers 44 is shown, the driven surface can be an outer surface of one or more of the rollers 44 without departing from the scope of the invention.

In a preferred embodiment, the driving member 62 is at least one bar positioned adjacent modules 12 of the belt 10 and arranged in a direction extending in the conveying direction. The driving member 62 is fixed relative to the conveying direction of the modules 12 and selectively engagable with the different locations on the driven surface 58 to rotatably drive the roller axle. In a preferred embodiment, the driving member 62 is selectively lowered into engagement with the driven surface 58. In another embodiment, multiple driving members 62 are disposed above the driven surface 58 and one of the driving members 62 is selectively engaged with the driven surface 58 depending upon the desired rotational speed of the roller axle 42. Although a driving member 62 fixed relative to the conveying direction of the modules 12 is shown, the driving member can be movable relative to the conveying direction of the modules, such as an endless driven belt engaging the driven surface, without departing the scope of the invention.

Figure 7A:
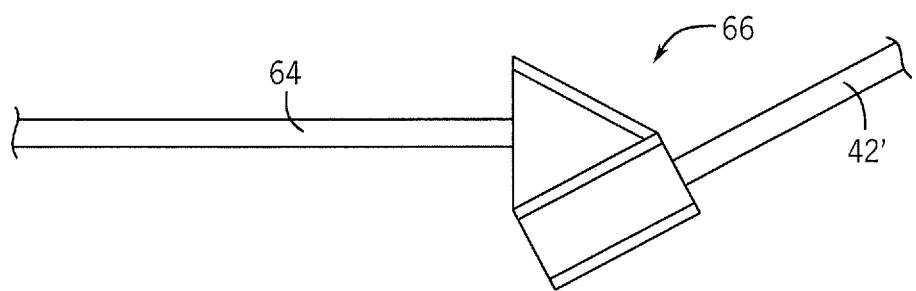
FIG. 7a is a front view of an alternative axle arrangement including a driven axle that rotatably drives a roller axle arranged at an angle with respect to the driven axle.
Figure 7B:
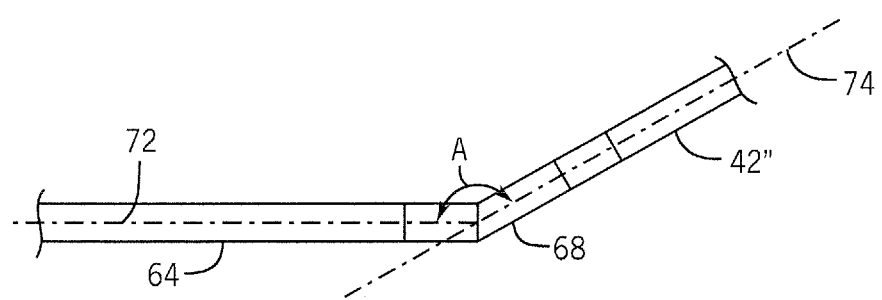
FIG. 7b is a front view of an alternative axle arrangement including a driven axle that rotatably drives a roller axle arranged at an angle with respect to the driven axle.
Figure 8:
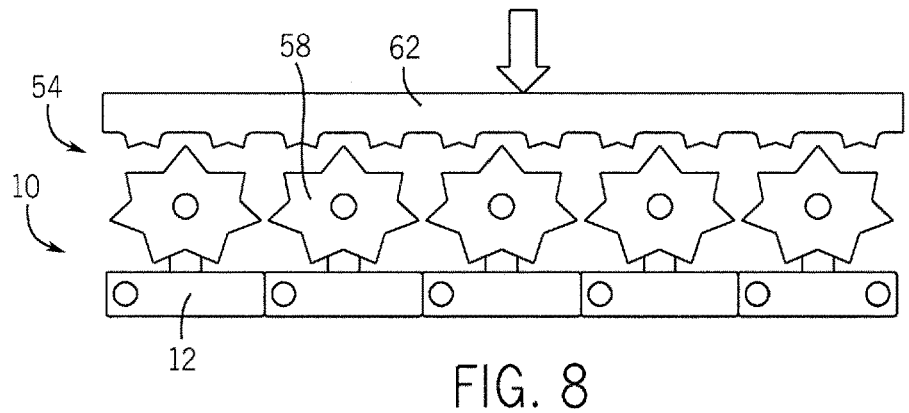
FIG. 8 is a side view of another modular conveyor belt assembly according to the invention and having toothed clutch assembly.

In the embodiment described above, the roller axle 42 is the driven axle. However, as shown in FIG. 7a, the embodiments described herein can include a separate driven axle 64 coupled to the roller axle 42' to provide other advantages. For example, the driven axle 64 can be coupled to the roller axle 42', such as by a frictional engagement or gear mechanism 66 that rotatably drives the roller axle 42' counter to the rotational direction of the driven axle 64 in order to urge objects on the rollers in the direction of conveyor travel and space the objects on the conveyor. If a gear mechanism is used, the mechanism can include an intermediate gear that rotates the roller axle in the same direction as the driven axle. Alternatively, as shown in FIG. 7b, the driven axle 64 can be coupled to a roller axle 42" by a flexible coupling 68, such as a tube engaging ends of the driven axle 64 and roller axle 42". The flexible coupling 68 allows a longitudinal axis 72 of the roller axle 42" to define an angle A with a longitudinal axis 74 of the driven axle 64, such that rollers fixed to and coaxial with the roller axle urge objects onto or off of the belt 10.

When the modules 12 are configured in a belt arrangement, i.e. two or more modules 12 define the belt width and are arranged in a side edge to side edge and leading edge to trailing edge configuration. In a belt that is multiple modules wide, the roller axles can be driven independently or extend across modules, either as a single axle or multiple axles coupled together. Moreover, as shown in FIG. 5, the roller axle can be driven from one or both sides of the belt with a driven surface fixed on each driven axle. Advantageously, when independent axles are driven by opposite sides of the belt, conveyed product can be accumulated side by side or a conveyed product can be oriented on the belt by driving the driven axle coupled to a driven surface on one side of the belt in a direction opposite of the driven axle coupled to a driven surface of the other side of the belt to spin the conveyed product on the belt.

The belt 10 is assembled by intermeshing the trailing edge hinge members 32 of one of the modules 12 with the leading edge hinge members 30 of the adjacent module 12, such that the trailing hinge member openings 52 of the one module 12 are aligned with and the leading edge hinge member openings 38 of the other module 12. A hinge pin 40 is then slipped through the aligned hinge member openings 38, 52 to pivotally link the adjacent modules 12 together.

Several alternate constructions of the inventive concept will be discussed below with respect to FIGS. 9-26.

Figure 9:
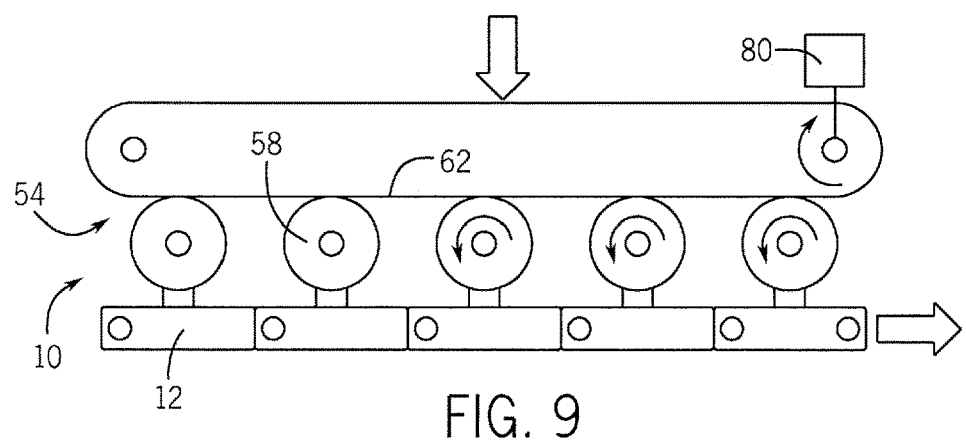
FIG. 9 is a side view of another modular conveyor belt assembly according to the invention and having a driving member including a motor driven belt.

FIG. 9 shows an alternate embodiment wherein the clutch 54 includes toothed driven surfaces 58 and a corresponding toothed driving member 62. The teeth can be corresponding star shapes, or the teeth may be acme gears or another gear shape, as desired. For example, the driven surfaces 58 and driving members 62 may be arranged similar to a rack and pinion. Similar to the embodiment illustrated in FIGS. 1-4 the driving member 62 may be a stationary element that is raised and lowered into engagement with the driven surfaces 58 to effect rotation of the rollers 44.

Figure 10:
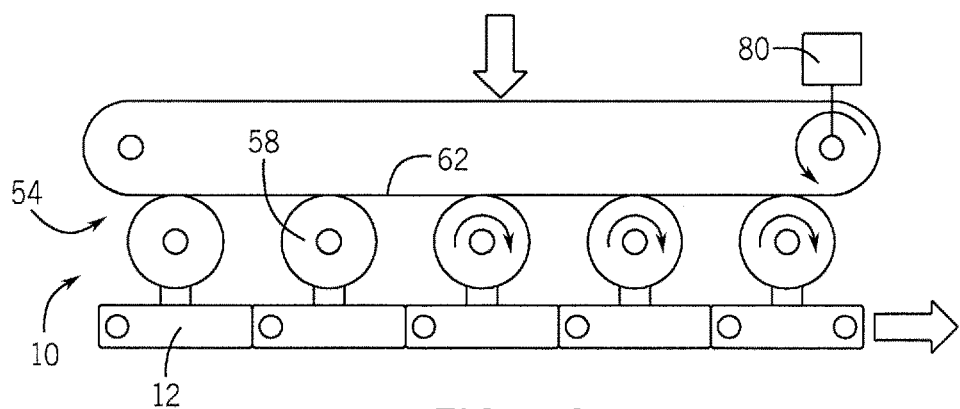
FIG. 10 is a side view of the modular conveyor belt assembly of FIG. 9 showing the motor driven belt rotating in a direction opposite of that shown in FIG. 9.

FIGS. 9 and 10 show an alternate embodiment wherein the driving member 62 is a continuous belt driven by a motor 80. The motor 80 may be a constant speed motor or a variable speed motor, as desired. The motor 80 is arranged to selectively drive the driving member 62 to affect the behavior of the rollers 44. For example, in FIG. 9 the motor 80 is rotating the driving member 62 such that the rollers 44 are rotated to accumulate the object 34, In FIG. 10 the motor 80 is driven in an opposite direction such that objects are accelerated along the rollers 44. The rotation of the rollers 44 may be affected to produce the relative motion of the object 34 as desired. For example, the level of deceleration and/or acceleration can be varied. In addition, a number of zones may be arranged along the direction of travel, each zone including a separate belt 62 and motor 80, such that sequential object 34 manipulation is provided.

Figure 11A:
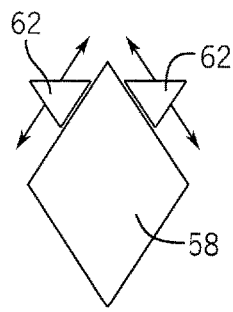
FIGS. 11a-c are side views of various clutch assemblies according to the invention.
Figure 11B:
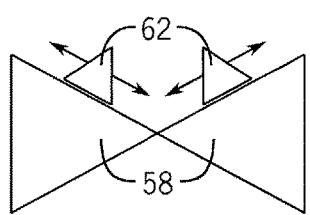
Figure 11C:
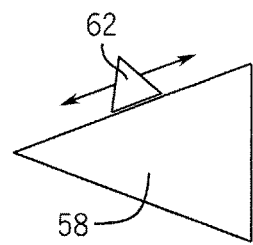

FIGS. 11a-c show various constructions of the driven surface 58 and the driving member 62. FIG. 11a depicts a cross-sectional view of a driven surface 58 that defines a diamond shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11b depicts a cross-sectional view of a driven surface 58 that defines an hourglass shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11c depicts a cross-sectional view of a driven surface 58 that defines conical shape. One driving member 62 is arranged to engage the driven surface 58 at varying positions along the driven surface 58 such that the rollers 44 would be driven at differing speeds as discussed above.

Figure 12:
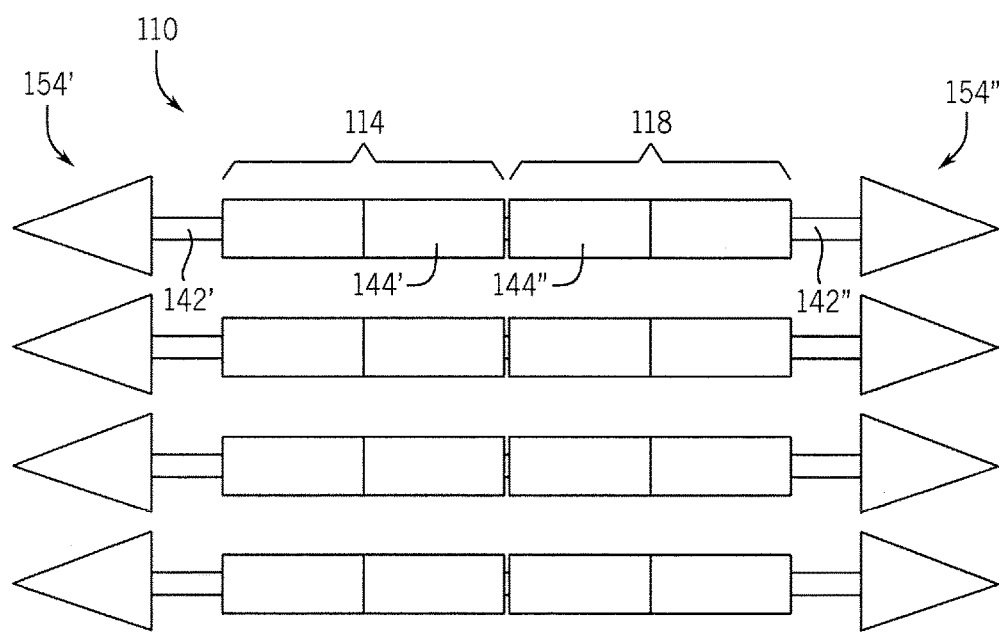
FIG. 12 is a top view of a two-zone modular conveyor belt assembly according to the invention.

FIG. 12 shows a modular conveying assembly 110 that includes a first motion zone 114 and a second motion zone 118. The first motion zone 114 includes an independent clutch 154' connected to rollers 144' by a roller axle 142'. The second motion zone 118 includes an independent clutch 154" connected to rollers 144" by a roller axle 142". The motion zones 114, 118 are operated independent of one another to create differing motion profiles.

Figure 13:
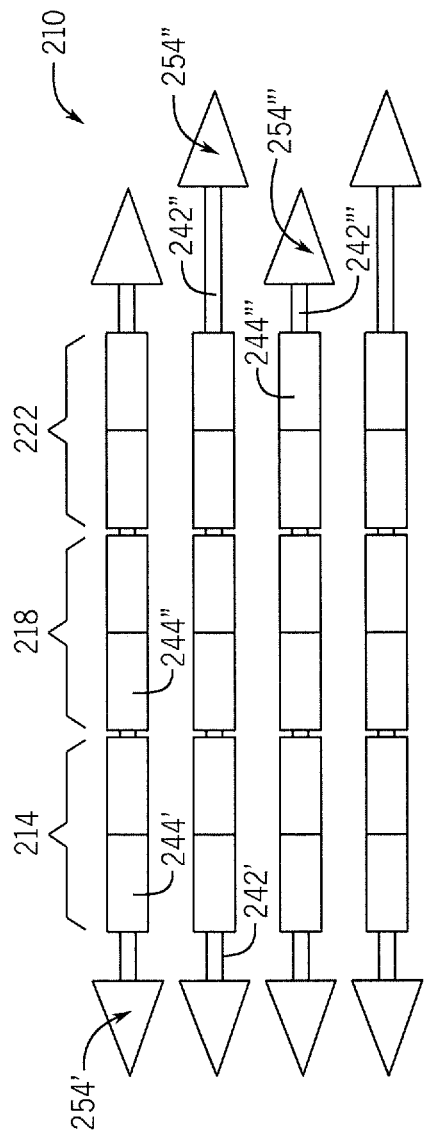
FIG. 13 is a top view of a three-zone modular conveyor belt assembly according to the invention.

FIG. 13 shows a modular conveying assembly 210 that includes a first motion zone 214, a second motion zone 218, and a third motion zone 222. The first motion zone 214 includes an independent clutch 254' connected to rollers 244' by a roller axle 242'. The second motion zone 218 includes an independent clutch 254" connected to rollers 244" by a roller axle 242". The third motion zone 222 includes an independent clutch 254''' connected to rollers 244''' by a roller axle 242'''. In the illustrated embodiment, the clutch 254" and the clutch 254''' are cantilevered past the right (as viewed in FIG. 13) end of the conveying assembly 210 and are staggered from one another in the width direction. The motion zones 214, 218, 222 are operated independent of one another to create differing motion profiles.

Figure 14:
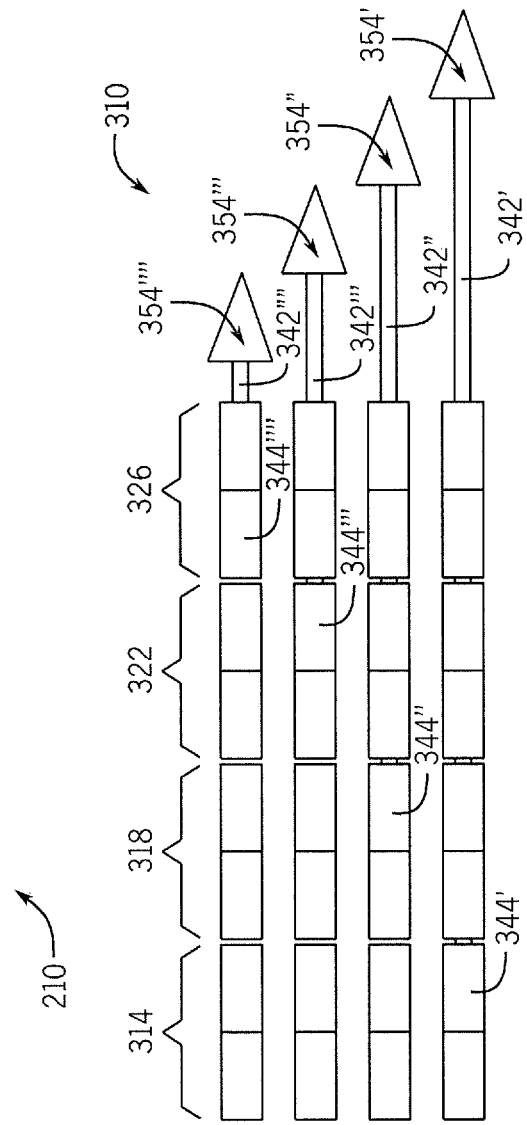
FIG. 14 is a top view of a four-zone modular conveyor belt assembly according to the invention.

FIG. 14 shows a modular conveying assembly 310 that includes a first motion zone 314, a second motion zone 318, a third motion zone 322, and a fourth motion zone 326. The first motion zone 314 includes an independent clutch 354' connected to rollers 344' by a roller axle 342'. The second motion zone 318 includes an independent clutch 354" connected to rollers 344" by a roller axle 342". The third motion zone 322 includes an independent clutch 354''' connected to rollers 344''' by a roller axle 342". The fourth motion zone 326 includes an independent clutch 354'''' connected to rollers 344" by a roller axle 342". In the illustrated embodiment, the clutches 354', 354", 354'''', and 354'''' are all cantilevered past the end of the conveying assembly 310 on a single side and are staggered from one another in the width direction. The motion zones 314, 318, 322, 326 are operated independent of one another to create differing motion profiles.

FIGS. 15 and 16 show a modular conveying assembly 410 that includes a first series of modules 412' and a second series of modules 412". The first series of modules 412' includes an independent clutch 454' including a driven surface 458' connected to rollers 444' by a roller axle 442'. The second series of modules 412" includes an independent clutch 454" including a driven surface 458" connected to rollers 444" by a roller axle 442". In the modular conveyor assembly 410, the driven surface 258' and the driven surface 258" are arranged in opposite orientations. In this configuration, when the driving member 462 is engaged with the driven surfaces 258' and 258" the speed of rotation of the rollers 244' and 244" will depend on the side-to-side position of the driving element 462. For example, if the driving element 462 is moved to the right in the depiction of FIG. 15, the rollers 444' of the first series of modules 412' will increase its rotational speed and the rollers 444" of the second series of modules 412" will decrease in rotational speed. In this way, various adjustable motion profiles are attainable.

FIGS. 17a and 17b show cross sections of two exemplary roller axles 42. As shown, the roller axle 42 may define a spline shape, or a keyway. Additionally, the roller axle my define other shapes (e.g., square oval, pegged, star, et cetera).

FIG. 18 shows how rollers 44 may be end connected to one another by teeth 474. FIG. 19 shows how rollers 44 may be end connected to one another by magnets 476. These connections between rollers 44 provide a way to transfer rotation without rigidly joining the rollers to the roller axle 42. Other configurations are contemplated for coupling the rollers together independent of the roller axle 42. For example, couplings, taper locks, and other connection types are usable.

Figure 20:
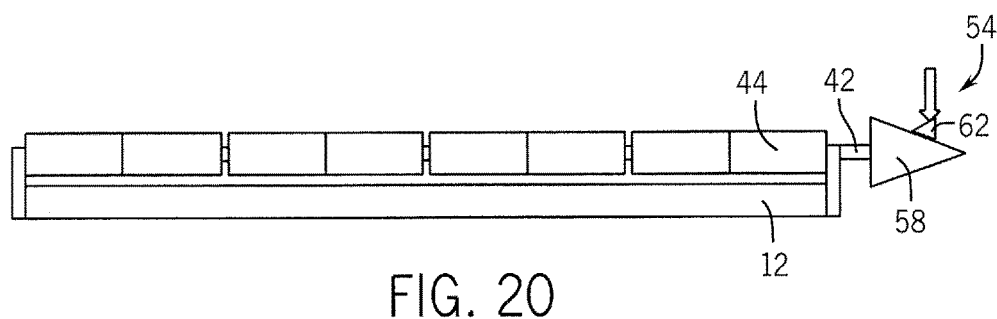
FIG. 20 is a front view of a radially actuated clutch on a modular conveyor belt assembly according to the invention.
Figure 21:
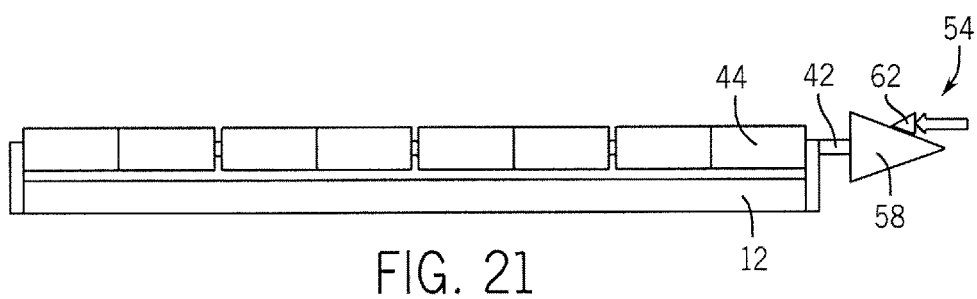
FIG. 21 is a front view of an axially actuated clutch on a modular conveyor belt assembly according to the invention.

FIGS. 20 and 21 illustrate how the driving member 62 may be actuated vertically or horizontally in and out of engagement with the driven surface 58. Any actuation scheme may be used to bring the driving member 62 into contact with the driven surface 58, as desired.

Figure 22:
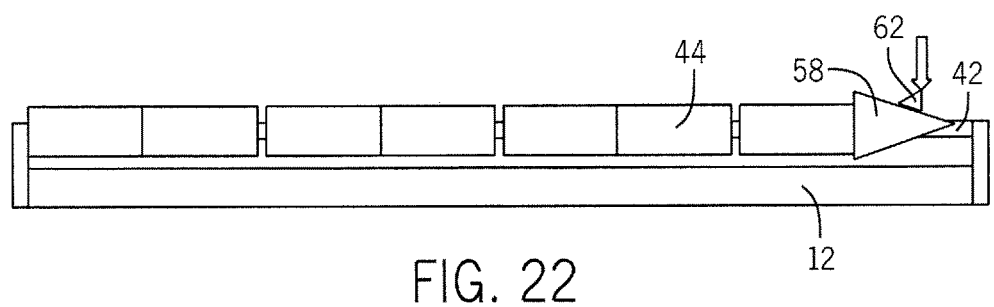
FIG. 22 is a front view of a modular conveyor belt assembly according to the invention that includes an inset clutch assembly.

FIG. 22 shows how the driven surface 58 may be inset on the module 12 as opposed to cantilevered.

Figure 23:
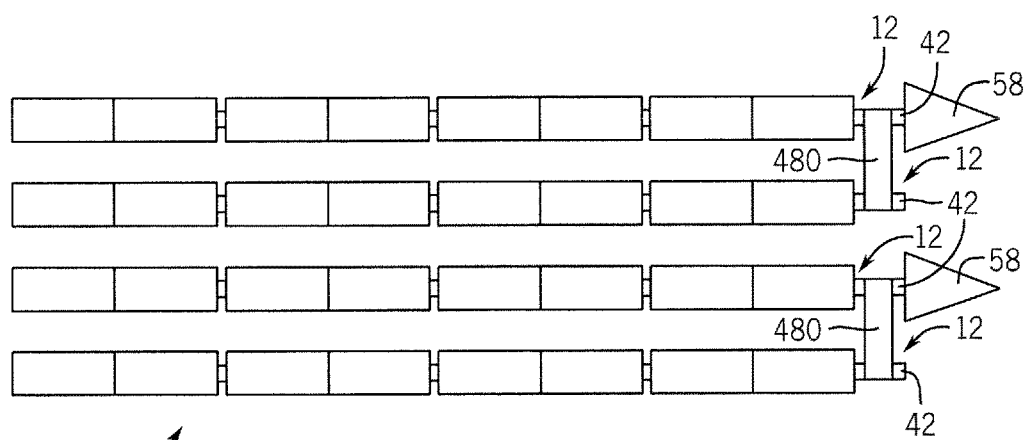
FIG. 23 is a top view of a modular conveyor belt assembly according to the invention that includes master and slave rollers.

FIG. 23 shows an arrangement where every other module 12 in the belt 10 does not include a driven surface 58 but it rather tied to an adjacent driven surface 58 by a belt 480 or other linkage capable of transferring the rotation from the driven surface 58 to the passive modules 12.

Figure 24:
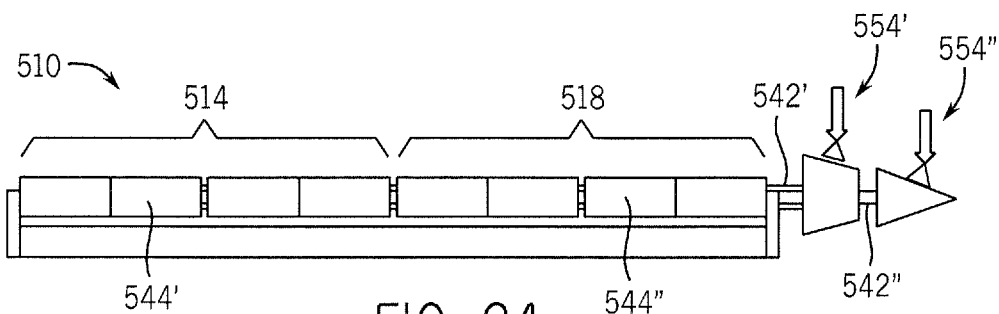
FIG. 24 is a front view of a modular conveyor belt assembly according to the invention that includes two different motion zones and coaxial roller axles.

FIG. 24 shows a modular conveying assembly 510 that includes a first motion zone 514 and a second motion zone 518. The first motion zone 514 includes an independent clutch 554' connected to rollers 544' by a first roller axle 542'. The second motion zone 518 includes an independent clutch 554" connected to rollers 544" by a second roller axle 542". The first roller axle 542' and the second roller axle 542" are arranged coaxially, with the first roller axle 542' arranged within the second roller axle 542". The motion zones 514, 518 are operated independent of one another to create differing motion profiles.

Figure 25:
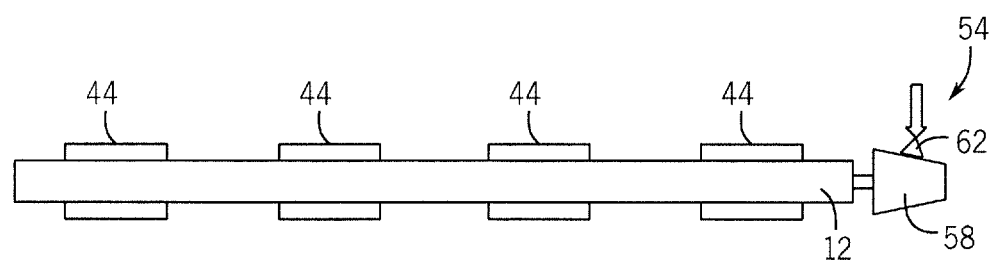
FIG. 25 is a front view of a modular conveyor belt assembly according to the invention that includes rollers that are mounted within the link and a cantilevered clutch assembly.
Figure 26:
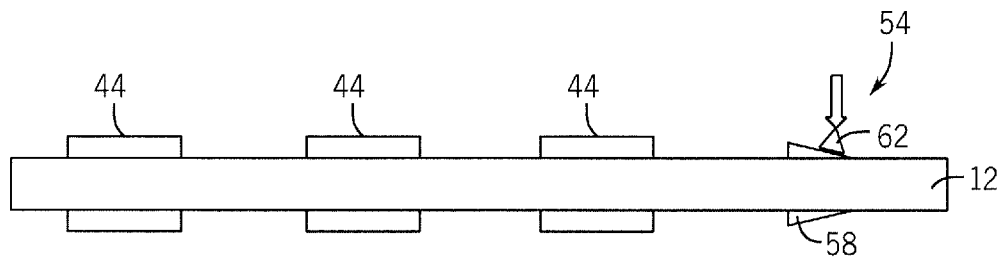
FIG. 26 is a front view of a modular conveyor belt assembly according to the invention that includes rollers that are mounted within the link and an inset clutch assembly.

FIGS. 25 and 26 illustrate how the rollers 44 may be set within the web of the module 12 without being raised above the surface 24 by the supports 26. FIG. 25 shows the clutch 54 cantilevered and FIG. 26 shows the clutch 54 set within the web of the module 12.

Figure 27:
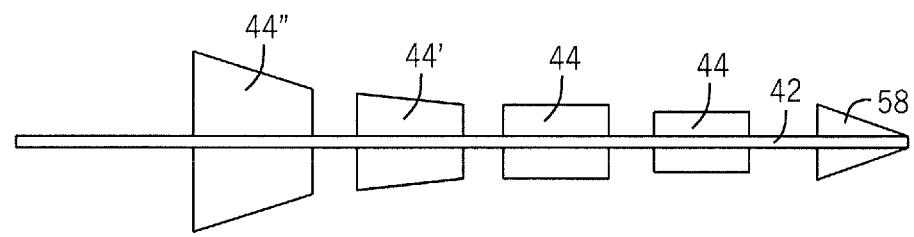
FIG. 27 is a front view of a modular conveyor belt assembly according to the invention that includes shaped rollers.

FIG. 27 shows an example of how the rollers 44 may have different shapes to provide different motion profiles of the object 34. In the illustrated embodiment, rollers 44 have a consistent diameter and are generally cylindrically shaped. Rollers 44' and 44" are generally conically shaped such that they would tend to move the object 34 to the right (as viewed in FIG. 27). Other roller shapes are considered including different arrangements of shapes. These shaped rollers may be used to direct object 34 flow on the modular conveyor assembly 10. For example, a flow of objects 34 could be divided, shifted, concentrated, or manipulated in another way as desired.

A product separation operation will be discussed below with reference made to FIGS. 28-30. The following description will make exemplary reference to the belt 10 but it is to be understood that the following operations could be accomplished with any conveying assembly according to the invention.

Current methods for indexing and creating separation between adjacent products require complicated conveyor line assemblies and arrangements. Additional controls are typically necessary and increase the cost and complexity of indexable systems. Indexable systems also typically require more floor space that standard conveyor assemblies.

Using the inventive belt 10 allows for a simpler, more versatile and efficient conveyor systems that can provide indexing.

The indexing operation takes advantage of the belt's 10 ability to counter rotate the rollers 44 via actuation of the driving member 62. In the following example, three driving members 62 will be discussed, although any number of driving members 62 may be used, as desired. As discussed above, the arrangement of the driven surfaces 58 and the driving members 62 affects the relative angular velocity of the rollers 44 relative to the movement of the belt 10 in a linear direction. This allows the movement of objects $34_{1-5}$ to be manipulated as discussed below.

Manipulation zones are created by strategically placing actuators in the form of driving members 62 along the length of the belt 10. The manipulation zones may be arranged to decelerate the objects $34_{1-5}$ backward, hold the objects $34_{1-5}$ stationary, or accelerate the objects $34_{1-5}$ forward. Activating or applying a particular driving member 62 applies the arranged manipulation within the associated manipulation zone, and deactivating the driving member 62 allows the object $34_{1-5}$ to move along with the belt 10 normally. In the immediate example, the activated rollers 44 maintain the associated object 34 in position without shutting down the conveyor belt 10 and with minimal contact pressure on adjacent objects 34.

Utilizing the inventive belt 10, the activation of the manipulation zones occurs on the outer edges of the system, thus creating a simpler system design. The system is also capable of various different product handling scenarios with a single length of belt 10 eliminating extra costly components (drives, gearboxes, vfd, et cetera).

Figure 28:
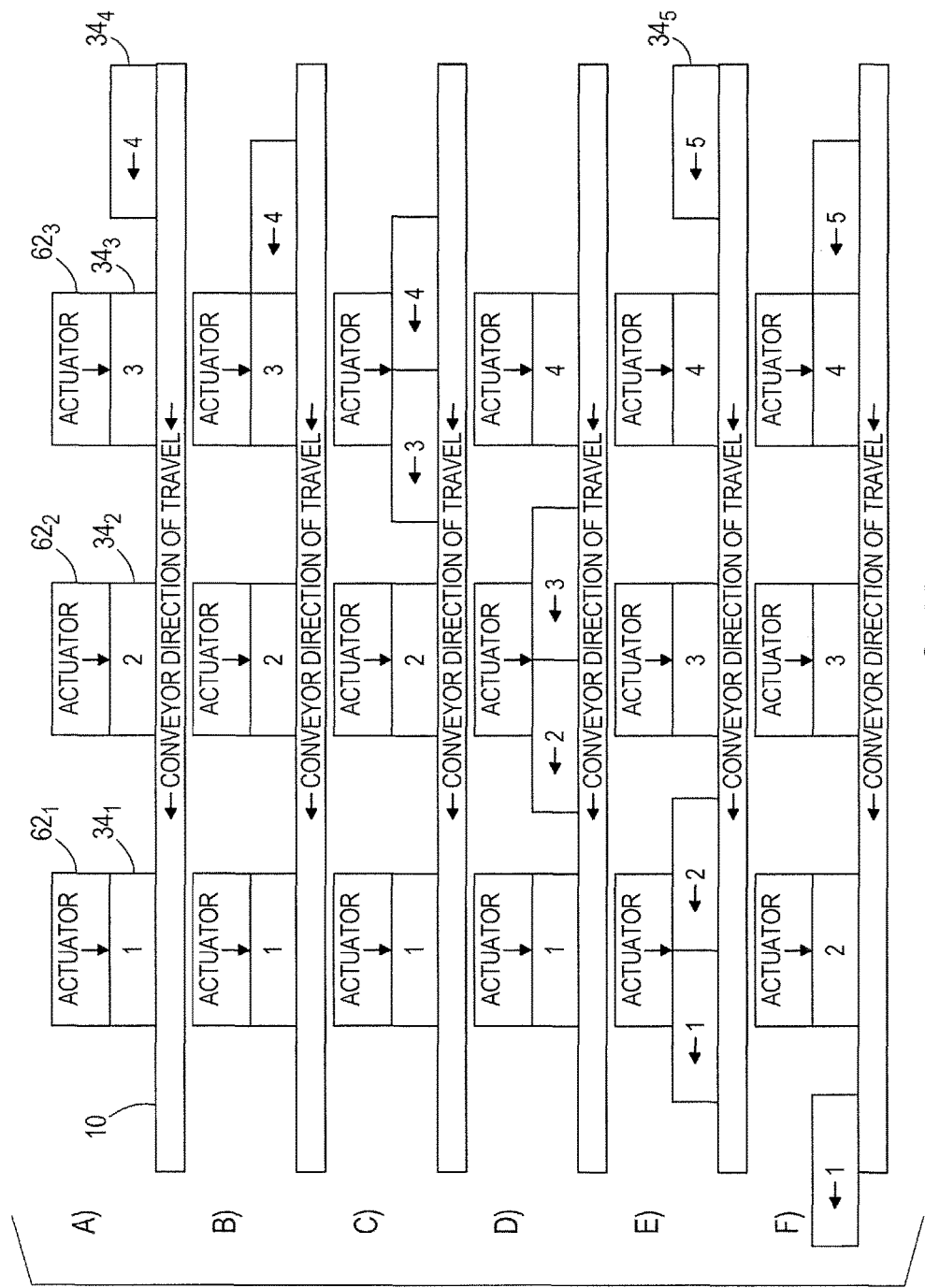
FIG. 28 is a diagram representing the modular conveyor belt assembly of FIG. 1 during a bump-through indexing operation.

With specific reference to FIG. 28, in a bump-through indexing operation, the belt 10 is illustrated conveying objects $34_{1-5}$ from right to left. In snapshot A, a first driving member $62_1$ is activated and maintaining a first object $34_1$ stationary. Likewise a second driving member $62_2$ and a third driving member $62_3$ are maintaining second and third objects $34_2$, $34_3$ stationary as a fourth object $34_4$ approaches.

In snapshot B, the forth object $34_4$ bumps into the third object that is maintained stationary by the third driving member $62_3$ and forces the third object $34_3$ out the manipulation zone of the third driving member $62_3$ as shown in snapshot C. The third object $34_3$ then moves along the belt 10 with the conveyor until it contacts and bumps the second object $34_2$ out of the second manipulation zone controlled by the second driving member $62_2$ as shown in snapshot D. The process continues until the first object $34_1$ is bumped out of the first manipulation zone controlled by the driving member $62_1$ and is allowed to continue along the direction of belt movement as shown in snapshot F.

As shown in snapshots E and F, the bump-through indexing operation can be used to provide equal spacing between objects with minimal contact pressure. In other words, objects 34 may be loaded onto the belt 10 at inconsistent intervals and the manipulation zones are used in the bump-through indexing operation will output the objects at even spacing as desired.

Figure 29:
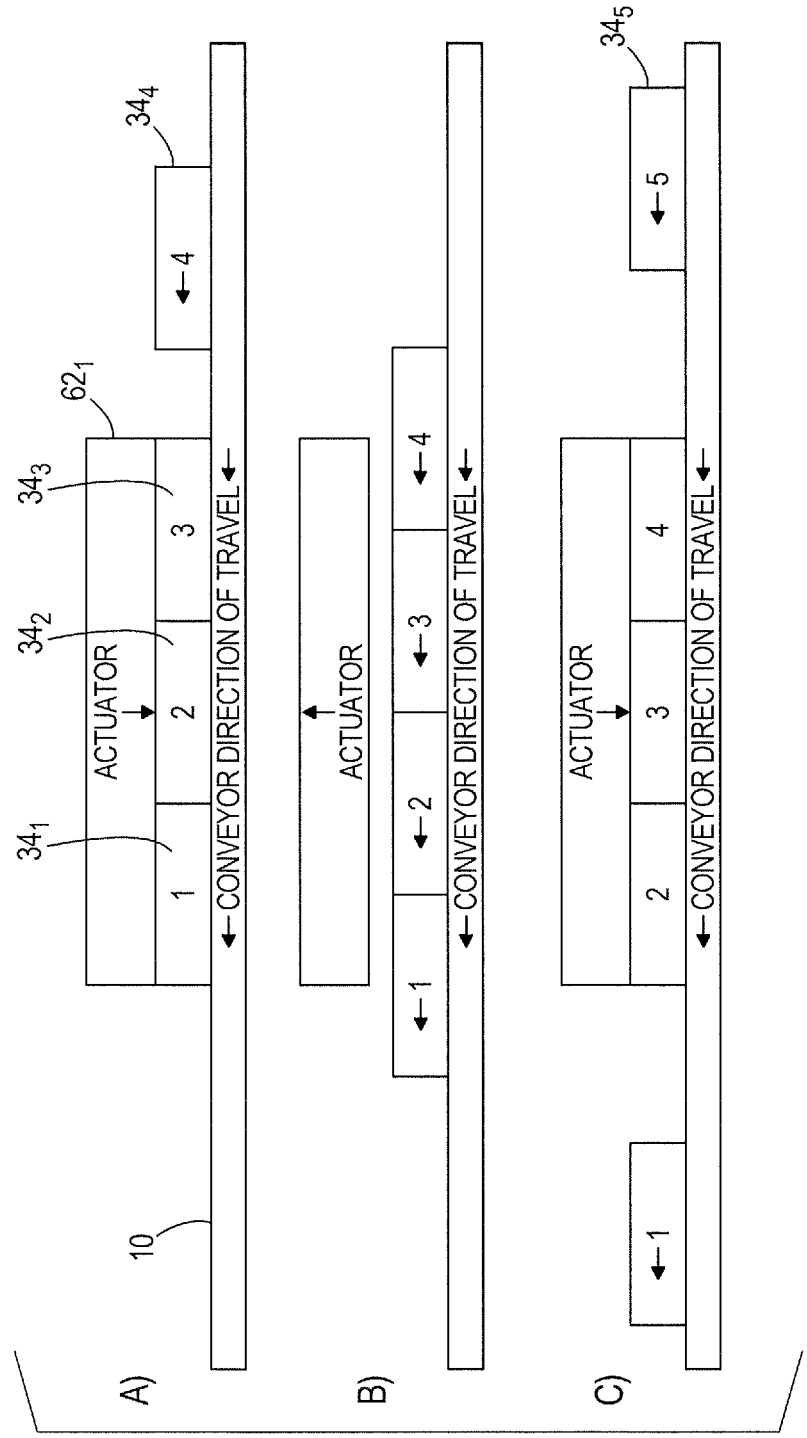
FIG. 29 is a diagram representing the modular conveyor belt assembly of FIG. 1 during a slug-control indexing operation.

With specific reference to FIG. 29, in a slug-control indexing operation, a single actuator in the form of a driving member 62 is actuated between an on position (see snapshot A) wherein objects 34 in the manipulation zone are maintained stationary, and an off position (see snapshot B) wherein objects 34 in the manipulation zone are permitted to travel along the belt 10 in the direction of belt travel.

As shown in snapshot A, with the driving member 62 in the on position, a plurality of objects (in this case, three objects $34_{1-3}$) can be maintained stationary. When a fourth object $34_4$ abuts or approaches the third object $34_3$, the driving member 62 is actuated to the off position, and the objects $34_{14}$ are allowed to continue along with the belt 10.

As the fourth object $34_4$ fully enters the manipulation zone, the driving member 62 is actuated to the on position (see snapshot B) and the second through forth objects $34_{2-4}$ are maintained stationary until a fifth object $34_5$ arrives (see snapshot C).

Figure 30:
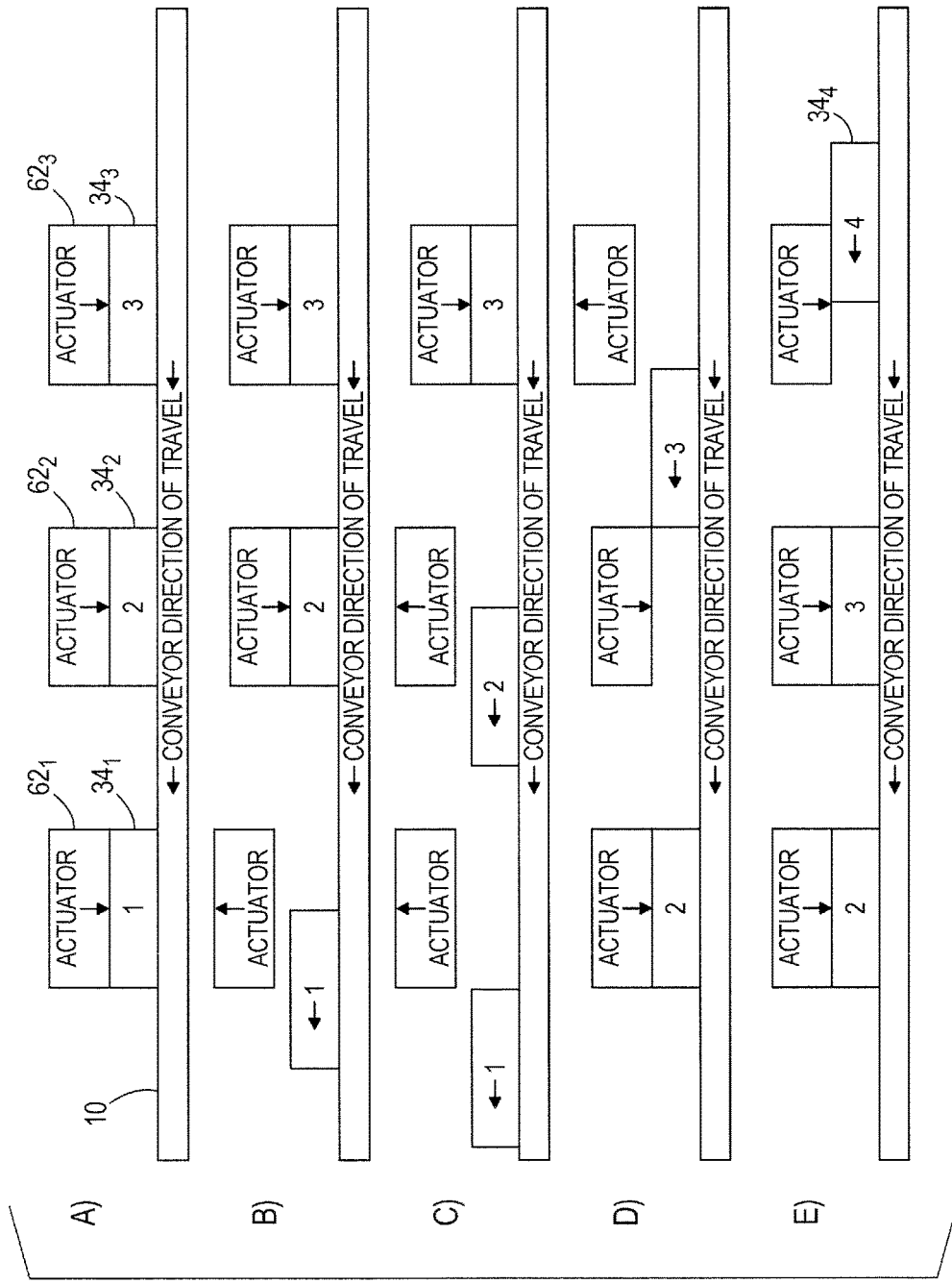
FIG. 30 is a diagram representing the modular conveyor belt assembly of FIG. 1 during a catch-and-release indexing operation.

With specific reference to FIG. 30, in a catch-and-release indexing operation, three actuators or driving members $62_{1-3}$ are utilized and sequentially move between on positions and off positions as indicated in snapshots A-E to index objects $34_{1-4}$ as they move along with the belt 10.

Figure 31:
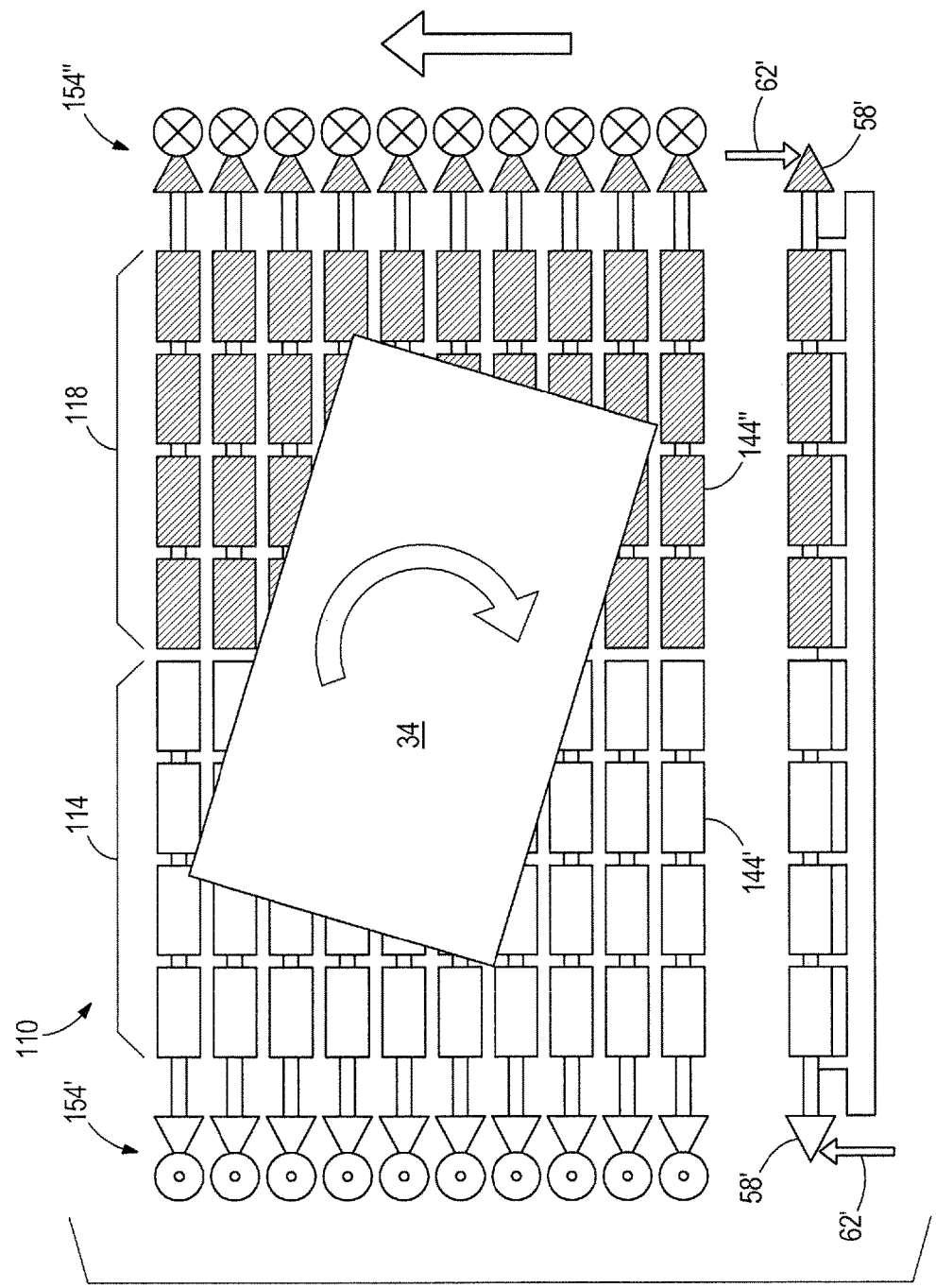
FIG. 31 is a diagram representing the two-zone modular conveyor belt assembly of FIG. 12 during a box or case turning operation.
Figure 32:
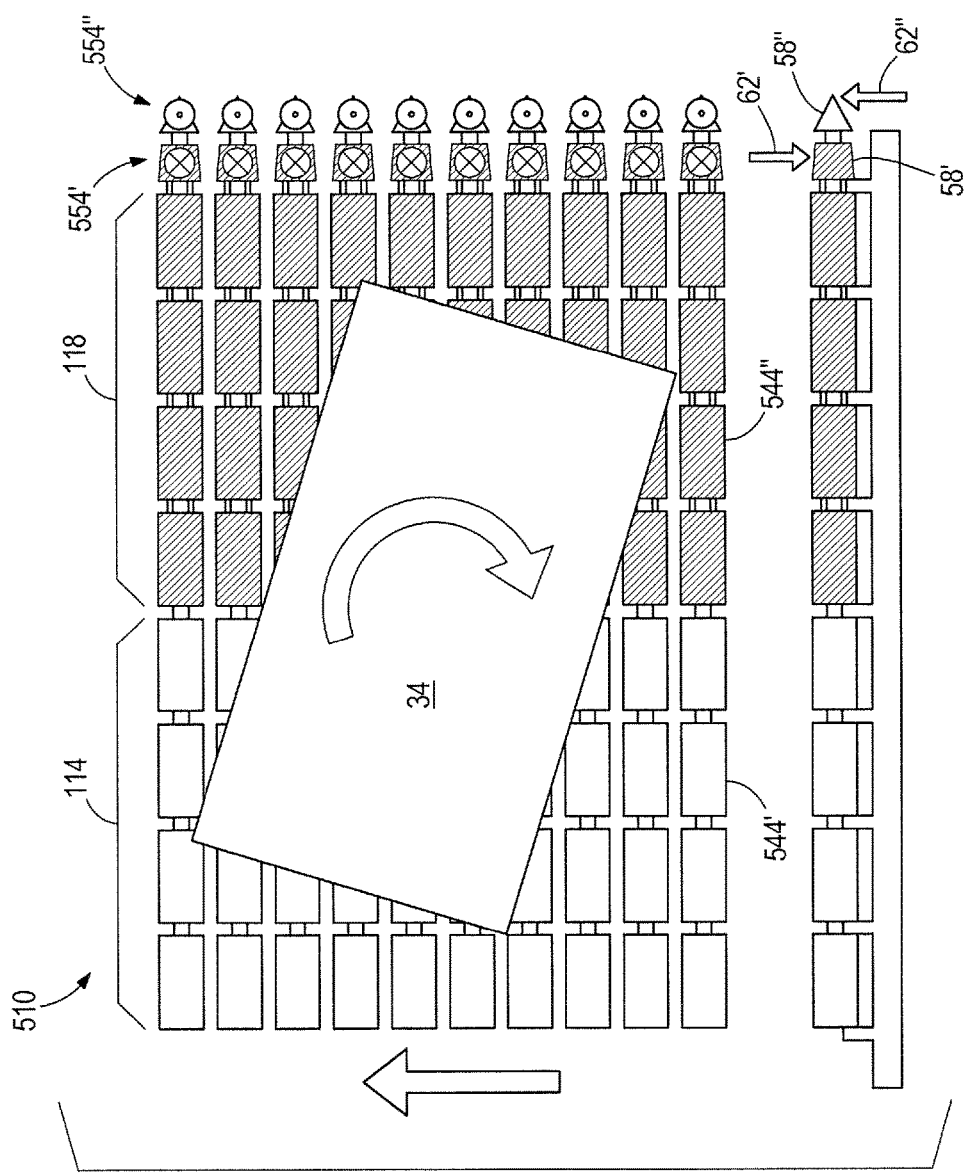
FIG. 32 is a diagram representing the modular conveyor belt assembly of FIG. 24 during a box or case turning operation.
Figure 33:
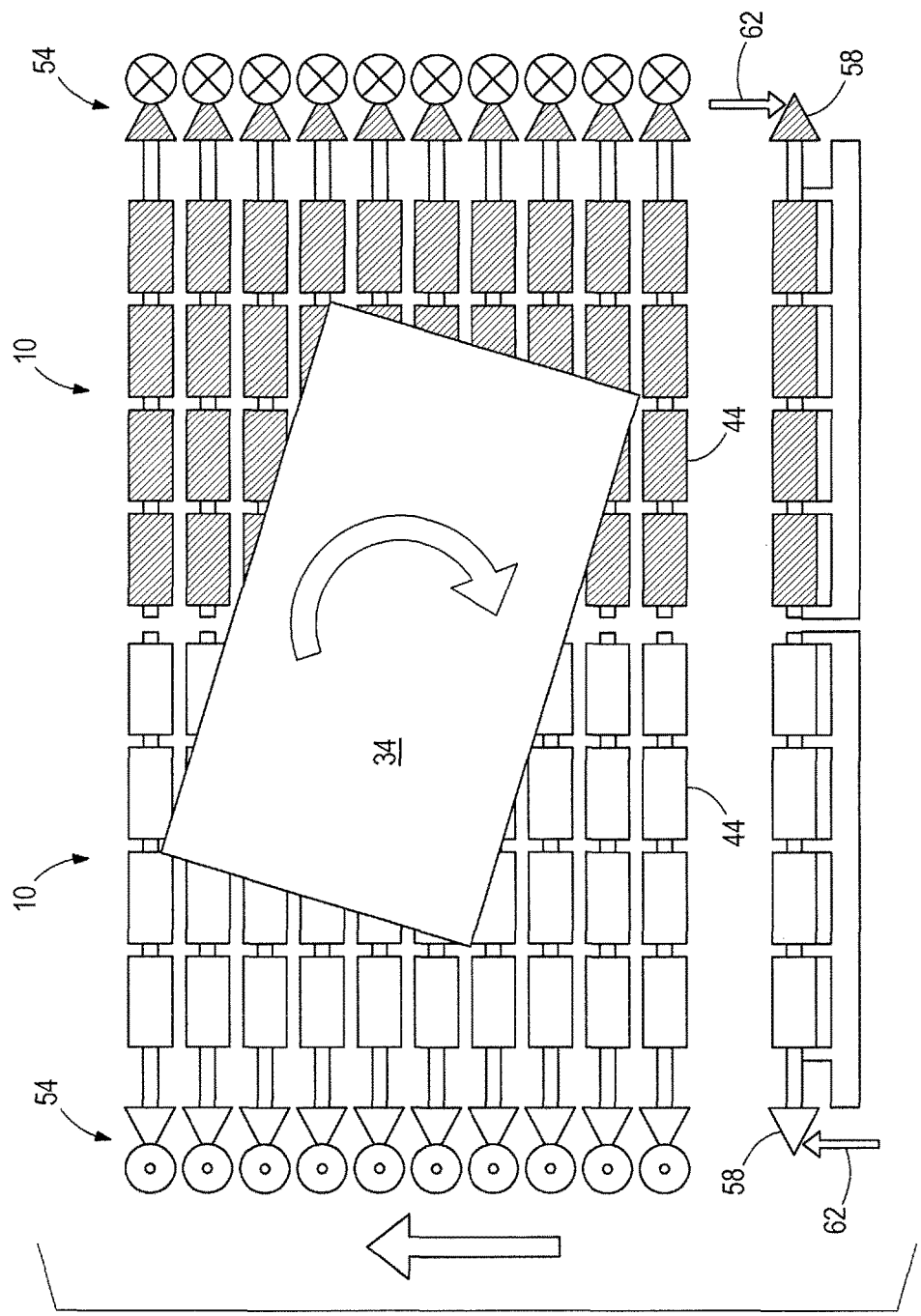
FIG. 33 is a diagram representing two of the modular conveyor belt assemblies of FIG. 1 during a box or case turning operation.

Turning to FIGS. 31-33, various box or case turning operations are shown. Typical case turning conveyors utilize a bump turn or multiple conveyors running at varying speeds to orientate a object. These solutions provide limited control, can damage product, and need to be tailored to specific product geometries. The invention can be utilized to selectively or continuously rotate a product to any position, with minimal contact and multiple product geometries on the same conveyor.

With specific reference to FIG. 31, the modular conveying assembly 110 discussed above with respect to FIG. 12 can be used to rotate or turn the object 34. As the belt 110 moves in the direction of conveyance, the first clutch 154' is activated by engaging a driving member 62' with a bottom surface of a driven member 58' thereby rotating the rollers 144' in the first motion zone 114 forward relative to the direction of belt travel. The second clutch 154" is also activated by engaging a driving member 62" with a top surface of a driven member 58" thereby rotating the rollers 144" in the second motion zone 118 backward relative to the direction of belt travel.

The result of the relative rotations of the first motion zone 114 and the second motion zone 118 is that the object 34 rotates. By adjusting the clutches 154' and 154" the relative speed of rotation can be adjusted to create a desirable rotation profile for the object 34.

FIG. 32 illustrates how the box turning operation can be applied using the coaxial modular conveying assembly 510 described above with respect to FIG. 24. FIG. 33 illustrates how the box turning operation can be applied using two side-by-side conveyor belt assemblies 10. Those skilled in the art will appreciate how the clutches 54, 154, 554 can be manipulated to adjust the characteristics of the box turn motion.

Figure 34:
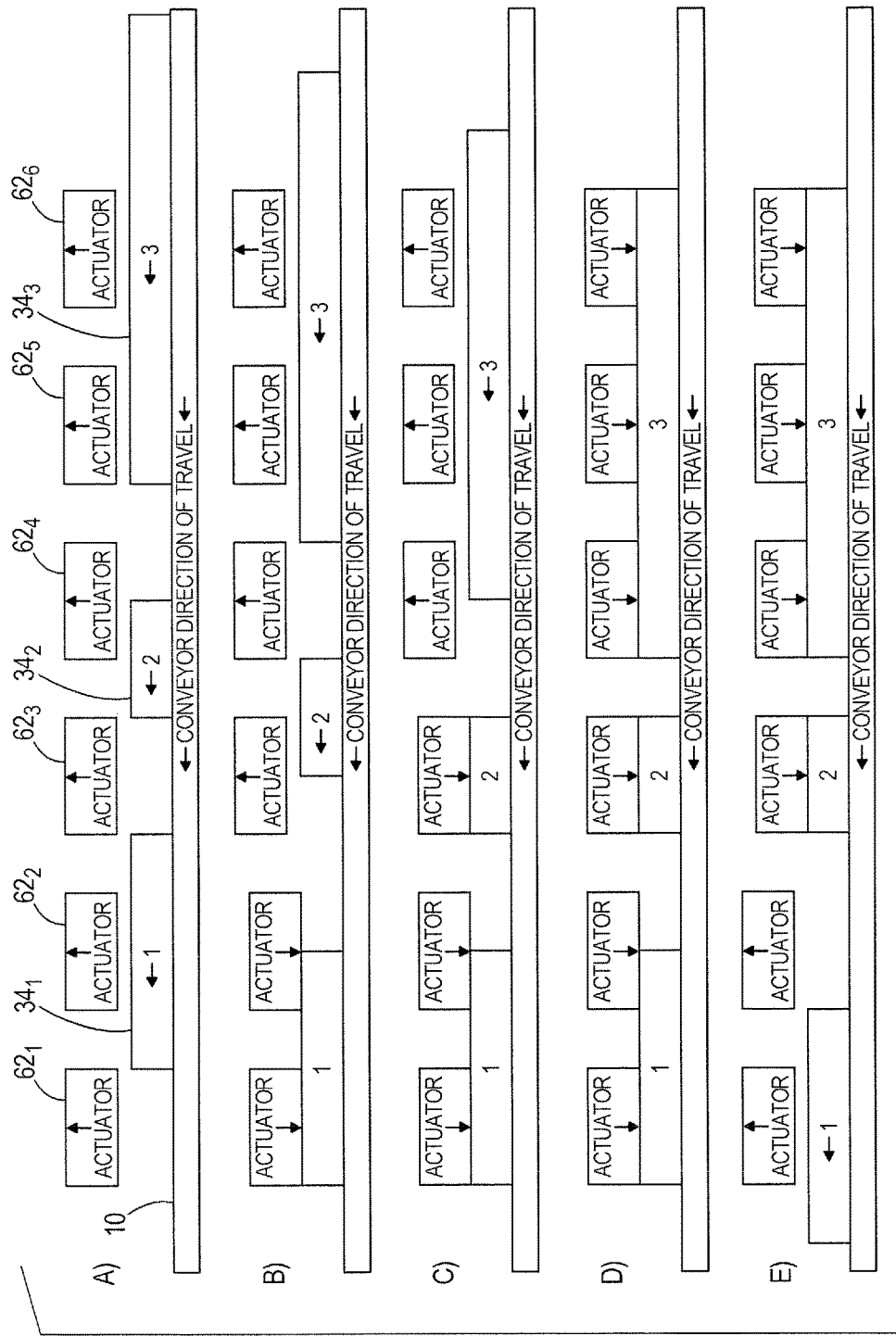
FIG. 34 is a diagram representing the modular conveyor belt assembly of FIG. 1 during a zero-pressure accumulation operation.

FIG. 34 illustrates how a number of manipulation zones can be arranged along the length of the belt 10 to provide a zero pressure accumulation operation. FIG. 34 shows six driving members 62 spaced apart from one another along the belt 10. The conveyor system can be installed with sensors and a control system that actuates the driving members 62 to affect the motion of objects $34_{1-3}$ along the belt 10. In this way, objects $34_{1-3}$ of different sized and weights can be spaced apart as desired without contacting one another and without the necessity to shut down sections of the conveyor system.

While there has been shown and described what are at present considered the preferred embodiments of the invention, it will be obvious to those skilled in the art that various changes and modifications can be made therein without departing from the scope of the invention defined by the appended claims. For example, the individual features described in the drawings may include one or more features from another embodiment. For example, the coaxial axles 542' and 542" of FIG. 24 may be arranged in the web of the module 12 as shown in FIGS. 25 and 26.

We claim:

1. A method of turning an object on a conveyor assembly, the method comprising:
    supporting the object on first rollers of the conveyor assembly defining a first motion zone, wherein a first clutch is operably connected to the first rollers by a first roller axle, the first clutch including a first driven member fixed to the first roller axle and a first driving member adjacent to the first driven member, and second rollers of the conveyor assembly defining a second motion zone, wherein a second clutch is operably connected to the second rollers by a second roller axle, the second clutch including a second driven member fixed to the second roller axle and a second driving member adjacent to the second driven member, and wherein the first rollers and the second rollers move along a length of the conveyor assembly;
    activating the first clutch such that the first driven member engages with the first driving member to drive the first roller axle to rotate the first rollers in a first direction when moving along the length of the conveyor;
    activating the second clutch such that the second driven member engages with the second driving member to drive the second roller axle to rotate the second rollers in a second direction, opposite the first direction, when moving along the length of the conveyor; and
    turning the object as a result of the relative rotation of the first rollers and the second rollers.

2. The method of claim 1, wherein the first clutch and the second clutch are arranged on a first side of the conveyor assembly.

3. The method of claim 1, wherein the first motion zone and the second motion zone are arranged side-by-side.

4. The method of claim 1, wherein the first rollers are carried on a first module body and the second roller are carried on a second module body.

5. The method of claim 1, wherein activating the first clutch and activating the second clutch occurs substantially simultaneously.

6. The method of claim 1, further comprising the steps of:
    activating the first clutch by engaging the first driving member with a bottom surface of the first driven member thereby rotating the first rollers in the first manipulation zone in the first direction that is forward relative to the direction of conveyance; and activating the second clutch by engaging the second driving member with a top surface of the second driven member thereby rotating the second rollers in the second manipulation zone in the second direction that is backward relative to the direction of conveyance.

7. The method of claim 1, wherein:

the first rollers are rotatably coupled to the first roller axle such that rotation of the first roller axle causes rotation of the first rollers; and the second rollers are rotatably coupled to the second roller axle such that rotation of the second roller axle causes rotation of the second rollers.

8. The method of claim 1, wherein the first roller axle and the second roller axle are arranged coaxially.

9. The method of claim 1, the further comprising the step of adjusting the relative speed of rotation between the first rollers and the second rollers by adjusting the first clutch and the second clutch such that a desired rotation profile is created for the object.

10. The method of claim 1, further comprising the step of operating the first clutch and the second clutch independently.

* * * * *

UNITED STATES PATENT AND TRADEMARK OFFICE
CERTIFICATE OF CORRECTION

PATENT NO. : 10,457,495 B2
APPLICATION NO. : 15/522988
DATED : October 29, 2019
INVENTOR(S) : Justin Michael Stefanko et al.

It is certified that error appears in the above-identified patent and that said Letters Patent is hereby corrected as shown below:

In the Specification

Column 1, Line 9, "cairns" should be --claims--.

Column 1, Line 12, "ail" should be --all--.

Signed and Sealed this
Twenty-fourth Day of December, 2019

Andrei Iancu
*Director of the United States Patent and Trademark Office*